United States Patent
Tiedemann, Jr.

(10) Patent No.: US 6,275,478 B1
(45) Date of Patent: Aug. 14, 2001

(54) METHODS AND APPARATUSES FOR FAST POWER CONTROL OF SIGNALS TRANSMITTED ON A MULTIPLE ACCESS CHANNEL

(75) Inventor: Edward G. Tiedemann, Jr., San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 09/113,721

(22) Filed: Jul. 10, 1998

(51) Int. Cl.⁷ .................................................. H04B 7/185
(52) U.S. Cl. ............................................ 370/318; 455/515
(58) Field of Search .................................... 370/318, 310, 370/311, 312, 313, 328, 331, 332, 334, 337, 336, 335, 326, 329, 341, 345, 347; 455/434, 436, 439, 442, 38.3, 500, 524, 525, 515, 517, 113, 136, 139

(56) References Cited

U.S. PATENT DOCUMENTS

| | | | |
|---|---|---|---|
| 5,345,598 | * 9/1994 | Dent | 455/522 |
| 5,564,075 | 10/1996 | Gourgue | 455/69 |
| 5,604,730 | * 2/1997 | Tiedemann, Jr. | 370/252 |
| 5,621,723 | * 4/1997 | Walton, Jr. et al. | 370/335 |
| 5,806,003 | * 9/1998 | Jolma et al. | 455/522 |
| 5,881,368 | * 3/1999 | Grob et al. | 455/69 |
| 5,893,036 | * 4/1999 | Trandai et al. | 455/522 |
| 5,896,411 | * 4/1999 | Ali et al. | 375/130 |
| 5,930,242 | * 7/1999 | Mimura | 370/331 |
| 5,940,743 | * 8/1999 | Sunay et al. | 455/69 |
| 6,084,904 | * 7/2000 | Wang et al. | 375/130 |

FOREIGN PATENT DOCUMENTS

| | | |
|---|---|---|
| 0847147 | 6/1998 | (EP) . |
| 9502950 | 1/1995 | (WO) . |
| 9746041 | 12/1997 | (WO) . |

* cited by examiner

Primary Examiner—Dang Ton
Assistant Examiner—Phirin Sam
(74) Attorney, Agent, or Firm—Philip R. Wadsworth; Bruce W. Greenhaus; S. Hossain Beladi

(57) ABSTRACT

A method and apparatus for controlling the transmission of signals from one or more of a plurality of mobile stations to a base station on a plurality of M multiple access channels. A power control information packet formed from a plurality of power control bits is transmitted from the base station to the one or more mobile stations. Each of the power control bits in the power control information packet has a position that is mapped to a selected access channel and to a time offset within the selected access channel. The power control information packet is received at a first mobile station. A message is then transmitted from the first mobile station to the base station on a first access channel and at a first time offset associated with the first access channel. The message is transmitted from the first mobile station at a power level determined in response to a first power control bit in the power control information packet. The first power control bit is located in a first position in the power control information packet, the first position being mapped to the first access channel and the first time offset.

65 Claims, 13 Drawing Sheets

METHODS AND APPARATUSES FOR FAST POWER CONTROL OF SIGNALS TRANSMITTED ON A MULTIPLE ACCESS CHANNEL

BACKGROUND OF THE INVENTION

I. Field of the Invention

The present invention relates generally to mobile radio telephone systems. More particularly, the present invention relates to mobile radio telephone systems that control the output transmit power of information signals sent between mobile units and base stations. Even more particularly, the present invention relates to novel and improved systems and methods for quickly controlling the output transmit power of signals sent from mobile stations to base stations on multiple access channels within a mobile radio telephone system.

II. Description of the Related Art

In CDMA radio telephone systems operating in accordance with the TIA/EIA-95 standard (the IS-95 standard), the Access Channel (R-ACH) is used for communications from the mobile station to the base station when the mobile station is not assigned to a dedicated channel such as a Traffic Channel (TCH). The R-ACH carries originations, page responses, registrations, and acknowledgments to messages sent by the base station on the Paging Channel. The R-ACH is transmitted at a constant rate of 4800 bps. This is in contrast to the Traffic Channel which is variable rate. Details of an exemplary CDMA system can be found in U.S. Pat. No. 4,901,307. entitled "Spread Spectrum Multiple Access Communication System Using Satellite Or Terrestrial Repeaters", which is assigned to the assignee of the present invention and incorporated herein in its entirety by reference. The IS-95 standard is set forth in the TIA/EIA Interim Standard entitled "Mobile Station—Base Station Compatibility Standard for Dual-Mode Wideband Spread Spectrum Cellular System",TIA/EIA/IS-95, dated July, 1993, the contents of which are also incorporated herein by reference.

On the R-ACH, the mobile station uses a long code spreading mask that is specific to the base station. In particular, a base station can have up to seven Paging Channels. Associated with each Paging Channel is one or more R-ACHs (up to 32are permitted). Each R-ACH has a long code mask which determines the spreading sequence. The mask includes the identity of the base station associated with the channel, the Paging Channel to which the R-ACH is associated, and the number of the R-ACH. This provides a unique long code mask and thus a unique long code sequence for the particular R-ACH.

While certainly possible, the R-ACH is not operated in soft handoff. This is unlike the Traffic Channel which is operated in soft handoff. Furthermore, the R-ACH does not have fast power control as on the IS-95 Traffic Channel. On the Traffic Channel, the base station transmits a power control stream at 800 bps to the mobile station. BPSK modulation is used for the power control bit stream. One phase of the bit indicates that the mobile station is to increase is transmit power; another phase of the bit indicates that the mobile station is to decrease its transmit power. The base station determines whether to have the mobile station increase or decrease its transmit power by controlling the received energy to noise density in the base station to a threshold. If the received energy to noise density is less than the threshold, the base station has the mobile station increase its transmit power; if the received energy to noise density is greater than the threshold, the base station has the mobile station decrease its transmit power. This is described more in IS-95 and in U.S. Pat. Nos. 5,056,109 and 5,265,119, both of which are entitled "Method and Apparatus for Controlling Transmission Power In A CDMA Cellular Telephone System" and assigned to the assignee of the present invention and incorporated by reference herein.

One reason for not having fast power control on the R-ACH is that multiple mobile stations may transmit on the same R-ACH, thus making it hard to control with one power control stream. Furthermore, if there are many power control streams controlling one channel, it is not clear how to map the power control stream to the mobile station. U.S. Pat. No. 5,604,730 which is assigned to the assignee of the present invention describes how one power control stream can be used to control a number of mobile stations. As described below, the technique taught in this patent is also applicable to the invention described herein.

In CDMA systems operating in accordance with the IS-95 standard, the mobile station determines a level at which to transmit on the R-ACH based upon an open loop power control estimate, adjusted by some overhead parameters. More particularly, under the IS-95 standard, the mobile station attempts an access on a R-ACH by sending one or more access probes. An access probe is the message which the mobile station is trying to send to the base station. The mobile station starts by sending an access probe; if the mobile station does not receive an acknowledgment to this access probe, the mobile station increases its transmit power (by a value given in the overhead messages) and sends the probe again. This continues until the mobile station receives an acknowledgment or the mobile station has reached the limit of access probes which are permitted.

In any multi-access system, one key aspect of system design is congestion control. From the perspective of the R-ACH, congestion control is responsible for controlling the number of mobile stations simultaneously accessing a R-ACH. Congestion control is important since when too many mobile stations access the system, the system is unable to handle them. Specifically, there can be more transmissions on the reverse link than the base station is able to receive. This is a physical hardware limit. Secondly, the reverse CDMA channel has a capacity limit. When the capacity limit is reached, then the required transmit power of the mobile stations goes to infinity—thus, not permitting communications. Thus, it is necessary to keep the load on the channel within limits. Since the R-ACHs typically share the reverse channel with traffic channels, a certain fraction of the reverse capacity is typically allocated to the R-ACHs. It should be noted that excessive loading on the R-ACHs can create a substantial load on the reverse link, thus limiting the performance of mobile stations which are already assigned to a Traffic Channel. It should also be noted that the R-ACH itself is somewhat unstable as the actual throughput of the R-ACH may decrease after a certain load is reached on the reverse link. In order to control this load, the IS-95 standard has a number of congestion control mechanisms. These include access probe backoffs, access sequence backoffs, channel randomizations, and PN randomizations. However, IS95 lacks any mechanism for quickly enabling and disabling access to a R-ACH in order to control congestion.

These problems and deficiencies are recognized and solved by the present invention in the manner described below.

SUMMARY OF THE INVENTION

One aspect of the invention is directed to a method and apparatus for controlling the transmission of signals from one or more of a plurality of mobile stations to a base station on a plurality of M multiple access channels. A power control information packet formed from a plurality of power control bits is transmitted from the base station to one or more mobile stations. Each of the power control bits in the power control information packet has a position that is mapped to a selected access channel and to a time offset within the selected access channel. The power control information packet is received at a first mobile station. A message is then transmitted from the first mobile station to the base station on a first access channel and at a first time offset associated with the first access channel. The message is transmitted from the first mobile station at a power level determined in response to a first power control bit in the power control information packet. The first power control bit is located in a first position in the power control information packet, the first position being mapped to the first access channel and the first time offset.

In accordance with a further aspect, the invention is directed to a method and apparatus for controlling the transmission of signals from two or more of a plurality of mobile stations to a base station on a plurality of M multiple access channels. A power control information packet formed from a plurality of power control bits is transmitted from the base station to one or more mobile stations. Each of the power control bits in the power control information packet has a position that is mapped to a selected access channel. The power control information packet is received at a first mobile station and a second mobile station. Messages are then simultaneously transmitted from the first mobile station and the second mobile station to the base station on a first access channel. The messages from the first and second mobile stations are transmitted on the first access channel at power levels that are determined in response to only a first power control bit in the power control information packet, wherein the first power control bit is located in a first position in the power control information packet, and the first position is mapped to the first access channel.

In accordance with a further aspect, the invention is directed to a method and apparatus for controlling the transmission of signals from one or more of a plurality of mobile stations to a base station on one or more of a plurality of multiple access channels. A power control information packet formed from a plurality of power control bits is transmitted from the base station to one or more mobile stations. The power control bits in the power control information packet are transmitted using a modulation that permits each of the power control bits to assume one of first, second and third different states. The power control information packet is received at a first mobile station, and the first mobile station then identifies a state of a first power control bit associated with a first access channel. One of first, second or third operations is then performed at the first mobile station if the state of the first power control bit corresponds to the first state, wherein the first operation corresponds to initiating the transmission of message information from the first mobile station to the base station on the first access channel, the second operation corresponds to inhibiting the initiation of transmission of message information from the first mobile station to the base station on the first access channel, and the third operation corresponds to ceasing the transmission of message information from the first mobile station to the base station on the first access channel. The output power level of the first mobile station on the first access channel is increased if the state of the first power control bit corresponds to the second state, and the output power level of the first mobile station on the first access channel is decreased if the state of the first power control bit corresponds to the third state.

In accordance with yet a further aspect, the invention is directed to a method and apparatus for controlling the transmission of signals from one or more of a plurality of mobile stations to a base station on a plurality of M multiple access channels. A power control information packet formed from a plurality of power control bits is transmitted from the base station to one or more mobile stations. Each of the power control bits in the power control information packet has a position that is mapped to a selected access channel and to a time offset within the selected access channel. The base station next determines whether a mobile station accessed a first access channel during a time interval corresponding to a first time offset. If a mobile station accessed the first access channel during the time interval corresponding to the first time offset, then a first power control bit having a first position within the power control information packet is mapped to the first access channel and the first time offset. If a mobile station failed to access the first access channel during the time interval corresponding to the first time offset, then the first power control bit having the first position within the power control information packet is mapped to the first access channel and a second time offset associated with the first access channel.

In accordance with yet a still further aspect, the invention is directed to a method and apparatus for performing an access channel handoff for a mobile radio unit as the mobile radio unit moves from a first cell in a mobile radio telephone system to a second cell within the mobile radio system. At least one power control bit from a first base station associated with the first cell is transmitted to the mobile radio unit. The power control bit from the first base station is transmitted at a first time interval that corresponds to a first access channel associated with the first base station. At least one power control bit from a second base station associated with the second cell is also transmitted to the mobile radio unit. The power control bit from the second base station is transmitted at a second time interval, that may correspond to the first time interval used by the first base station. The power control bit from the second base station that corresponds to the access channel that was associated with the first base station. Each of the power control bits in the power control information packet has a position that is mapped to a selected access channel and to a base station associated with the selected access channel. The mobile radio unit receives the power control packet from the first base station and the power control packet from the second base station, determines the corresponding power control bits, and then determines the state of the power control bits. If the state indicates that a message is to be transmitted and the mobile station has a message to transmit, then the mobile station transmits the message on a selected access channel. Each of a set of prescribed base stations attempts to receive the transmission on the selected access channel and then sets the corresponding bit in the power control information packet in accordance with the received signal to noise ratio.

BRIEF DESCRIPTION OF THE DRAWINGS

The features, objects and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Basic Fast Access Channel Power Control

Figure 1:
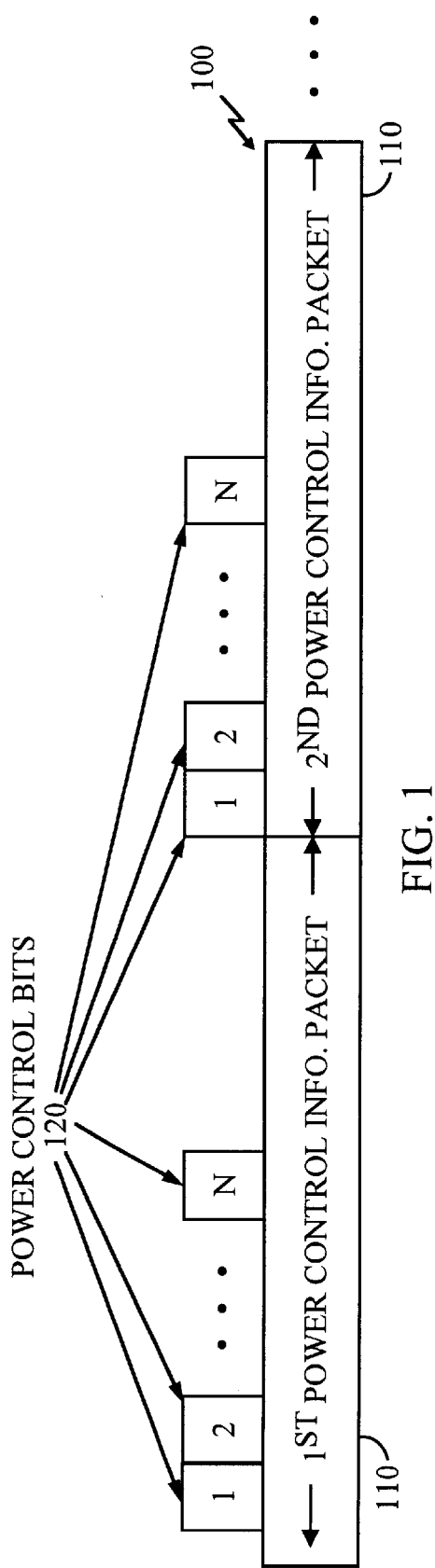
FIG. 1 is a diagram showing the structure of a bit stream formed from a plurality of power control information packets, in accordance with the present invention.

Referring now to FIG. 1, there is a diagram showing the structure of a bit stream 100 formed from a plurality of power control information packets 110, in accordance with the present invention. As explained more fully below, in the present invention the information included in power control information packets 110 is transmitted from base stations to mobile stations in a radio telephone system in order to control the output power of transmissions from the mobile stations to the base stations on one or more multiple access channels such as, for example, a reverse access channel (R-ACH) on a CDMA cellular system operating in accordance with the IS-95 standard. In addition, and as explained below, the information included in the power control information packets is used to regulate access to the multiple access channels by the mobile stations. The power control packets can be sequential on a separate channel as is shown in FIG. 1 or can be intermixed with data on a separate channel. This intermixing is well understood by those skilled in the art.

Each power control information packet 110 is comprised of N power control bits 120. In the embodiment shown in FIG. 1, each power control bit 120 in a power control information packet 110 maps to a single R-ACH and is used to control the output power on that R-ACH. Thus, the power control bit 120 labeled 1 controls the output power level of a mobile station transmitting on R-ACH (1), the power control bit labeled 2 controls the output power of a mobile station transmitting on R-ACH(2), and so on. In one embodiment, each of the power control bits is modulated in accordance with a combination of OOK (on-off keying) and BPSK modulation and can therefore assume three states, namely off, 0 degrees and 180 degrees. The second an third states (i.e. 0 and 180 degrees) are respectively used to convey on status and power-up and power-down commands to the mobile station in response to which the mobile station will, for example, either raise its output transmit power by 1 dB (if a power-up command is received) or lower its output transmit power by 1 dB (if a power-down command is received). Other power control steps sizes can well be used to optimize the system. Transmission of a power control bit 120 in the first state (i.e., 0 degrees) is used in the present invention for regulating access to the R-ACH associated (i.e., mapped to) the power control bit by mobile stations. In a preferred embodiment, each power information control packet 110 is 1.25 ms in duration, and the control packets 110 are transmitted from a base station to the mobile stations serviced by the base station on a forward link common control or power control channel.

In a simple version of the present invention, the power control bits 120 are transmitted continuously from a base station as a stream of BPSK modulated symbols. When a mobile station begins to access a particular R-ACH, the mobile station begins to pay attention to the power control bit stream 100 and, in particular, to the power control bit 120 that is mapped to the particular R-ACH that the mobile station has begun to access. If the power control bit 120 corresponding to the R-ACH accessed by the mobile station indicates that the mobile station is to increase its transmit power, the mobile station does such; similarly, if the power control bit 120 indicates that the mobile station is to decrease its transmit power, it does such. In one preferred embodiment, the base station transmits the power control bit 120 as an increase power command when the base station is not receiving any transmissions on the R-ACH associated with the power control bit (i.e., before the mobile station has attempted to access the R-ACH corresponding to the particular power control bit 120). Transmitting the power control bit 120 as an increase power command when the base station is not receiving any transmissions on the R-ACH associated with the power control bit causes the mobile station to increase its power level at the beginning of an access if, for example, the mobile station is transmitting at too low a power level.

Using fast power control as described herein permits accurate power control of the mobile station on the R-ACH, similar to that which can be done on the reverse traffic channel (R-TCH) of a CDMA system. Such fast power control is important for maximizing capacity of a mobile radio telephone system. Another advantage of the fast control is that it permits the mobile station to begin an R-ACH access by transmitting its signal with more power than is needed and then be rapidly corrected to the desired power level once the base station has acquired the mobile station's transmission.

Figure 2:
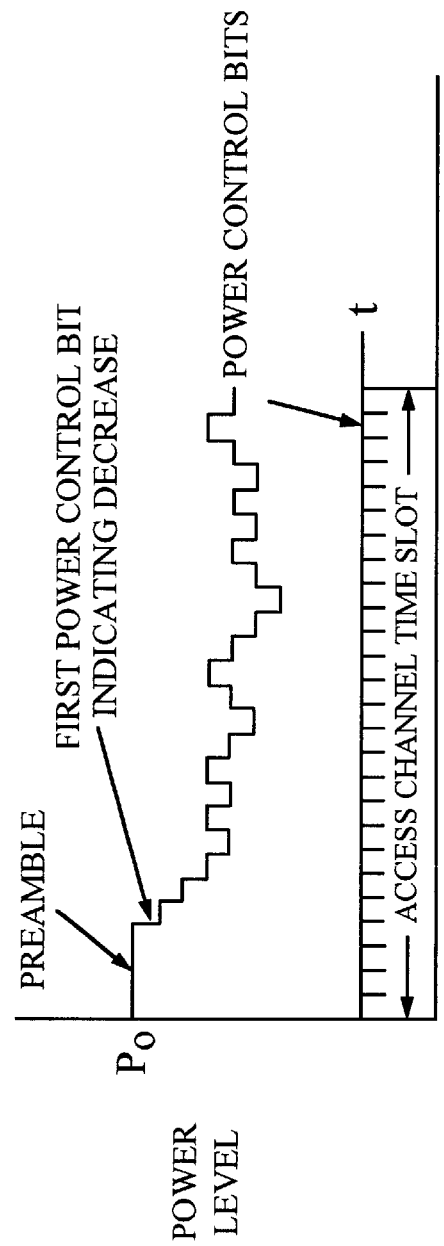
FIG. 2 is a timing diagram illustrating an exemplary access of a channel by a mobile station using the power control information packets of the present invention.

Referring now to FIG. 2, there is shown a timing diagram illustrating an exemplary access of a R-ACH by a mobile station using the power control information packets 110 of the present invention. As shown in FIG. 2, the access by the mobile unit to the R-ACH occurs during an access channel time slot. While a preferred embodiment uses time slots for the R-ACH, it should be noted that the teachings of this innovation do not require that the R-ACH be time slotted and are thus applicable to systems which are not slotted.

At the beginning of the access channel time slot, the mobile station initially transmits a message preamble at an initial power level P0. In one embodiment, the initial power level used during transmission of the message preamble corresponds to a power level that is about 3 dB higher than the power level of a first access probe that would otherwise be used by the mobile station to access the R-ACH under the IS-95 standard. After transmission of the message preamble, the mobile station starts to demodulate the power control information packets 110 and, in particular, the mobile station begins monitoring the value of the power control bit 120 in each of the power control information packets corresponding to the R-ACH now in use by the mobile station. In response to the values stored in these power control bits, the mobile station adjusts the output power of its transmissions either UP or DOWN (e.g., by plus or minus 1 dB) in response to each power control bit 120 associated with the R-ACH being used by the mobile station.

In accordance with a further aspect, the base station will wait until it detects a transmission from a mobile station (i.e., the mobile station will wait until it detects the message preamble) and has acquired transmissions from a mobile station before turning on the power control bit stream. The base station will determine whether to command the mobile station to power-up or power-down based on the power level of the received signal from the mobile station. More specifically, the base station will compare the power level of the received signal to a threshold; if the received signal is below the threshold, the base station will use the power control information packet to send a power-up command to the mobile station, otherwise, the base station will use the power control information packet to send a power-down command to the mobile station.

In the embodiments described above, each power control bit 120 in the power control information packet 110 is mapped to a single R-ACH. In such embodiments, if there are N power control bits 120 in each power control information packet 110, such information packets can be thought of as forming N bit streams each of which can be used to control one R-ACH as described above. One aspect of a multiple access channel such as the R-ACH is that multiple mobile stations can simultaneously access and transmit on such a channel. U.S. Pat. No. 5,604,730, assigned to the assignee of the present invention and incorporated herein in its entirety by reference, describes a method wherein a single power control bit stream may be used to control the power of multiple mobile stations operating simultaneously. The teachings of U.S. Pat. No. 5,604,730 can therefore be combined with the embodiment of the power control information packet 110 described above (i.e., where there is one-to-one mapping of the power control bits 120 to the R-ACH's) to permit the power levels of multiple mobile stations operating on the same R-ACH to be simultaneously controlled quickly using a single power control bit stream.

Figure 3:
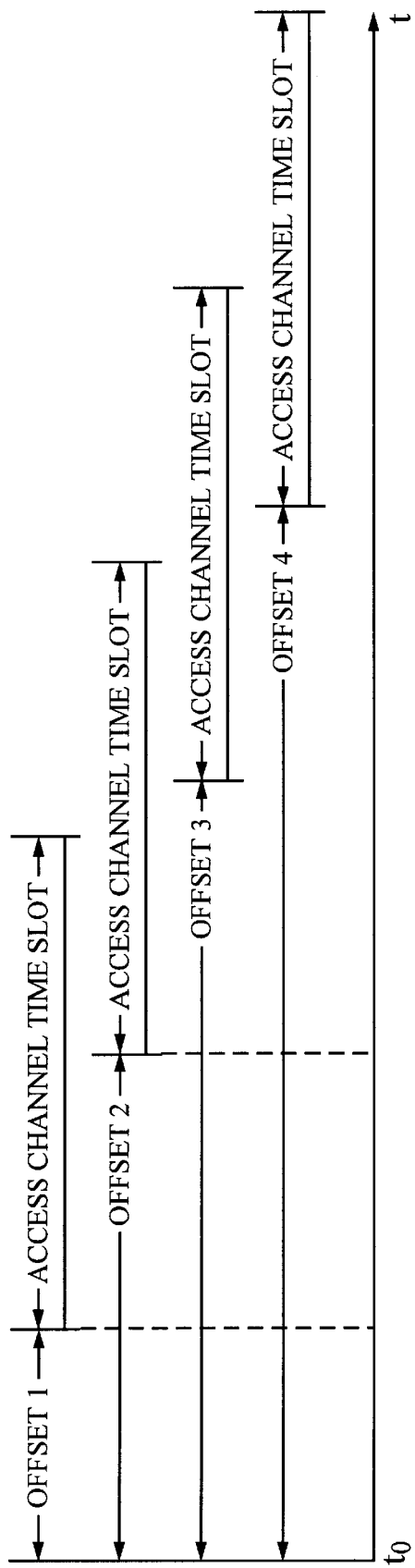
FIG. 3 is a timing diagram showing the staggering of access channel time slots within an access channel at different offsets, in accordance with the present invention.

As an alternative to the embodiment described immediately above, more than one power control bit stream can be used to control the operating power of multiple mobile stations operating on the same R-ACH. In this alternate embodiment, a different mapping structure is used to map the power control bits 120 to the mobile stations accessing on a specific R-ACH. More particularly, in this alternate embodiment the access channel time slots used for transmission by the mobile units are staggered in time by multiple offsets within each R-ACH as shown in FIG. 3. Each offset indicates a time when a mobile station may begin transmitting on a specific R-ACH. The time interval between successive time offsets is preferably greater than the largest path delay range (including maximum multipath delay) associated with transmissions from the base station to the mobile station in order to avoid ambiguities in determining which power control bit stream corresponds to a particular R-ACH and offset. In one embodiment of the invention, the Access Channel slots are divided into frames as is done in IS-95. In the instance of IS-95, a frame is 20 ms in duration. Thus, a slot is comprised of S frames, so that the slot is 20×S ms in duration, where S is either a fixed value or transmitted to the mobile station in system overhead information. To simplify a system design, it may be preferable to select the time interval between time offsets to be an integer number W of frames, where W is less than S.

In this embodiment, one power control bit 120 is used to control the power of mobile station(s) that begin their transmission on a given R-ACH in the first access slot (i.e., after offset 1), another power control bit 120 is used to control the power 120 of mobile station(s) that begin their transmissions on the same R-ACH in the second access slot (i.e., after offset 2), and so on. Although FIG. 3 shows four staggered accesses on a given R-ACH, it will be understood by those skilled in the art that any number of staggered accesses may be used on a single channel.

Referring still to the embodiment discussed in the paragraph above where each R-ACH is divided by multiple offsets to create multiple staggered access times for transmissions by mobile stations, an exemplary mapping of the power control bits 120 to the multiple R-ACH's available to the mobile stations for transmissions and the staggered access times available for such transmissions is shown in Table I below. The mapping shown in Table I assumes that there are M R-ACH's available to the mobile stations and K staggers (or offsets) per R-ACH, and that there is a one-to-one correspondence between each power control bit 120 and each offset within a given R-ACH. Given this one-to-one mapping, M×K power control bits 120 are needed in each power control information packet 110 in this embodiment of the invention.

TABLE I

| Power Control Bit Position | Access Channel Number | Offset Position |
|---|---|---|
| 1 | R-ACH1 | 1st Offset |
| 2 | R-ACH1 | 2d Offset |
| 3 | R-ACH1 | 3d Offset |
| ... | ... | ... |
| k | R-ACH1 | kth Offset |
| k + 1 | R-ACH2 | 1st Offset |
| k + 2 | R-ACH2 | 2d Offset |
| k + 3 | R-ACH2 | 3d Offset |
| ... | ... | ... |
| 2k | R-ACH2 | kth Offset |
| 2k + 1 | R-ACH3 | 1st Offset |
| 2k + 2 | R-ACH3 | 2d Offset |
| 2k + 3 | R-ACH3 | 3d Offset |
| ... | ... | ... |
| 3k | R-ACH3 | kth Offset |
| ... | ... | ... |
| (M − 1)*k | R-ACH (M) | 1st Offset |

TABLE I-continued

| Power Control Bit Position | Access Channel Number | Offset Position |
|---|---|---|
| ((M − 1)*k) + 1 | R-ACH (M) | 2d Offset |
| ((M − 1)*k) + 2 | R-ACH (M) | 3d Offset |
| M*k | R-ACH (M) | kth Offset |

In order to reduce the forward link loading and slightly increase capacity, a base station using a power control system that conforms with the mapping shown in Table I above will, in a preferred embodiment, refrain from transmitting the power control bit associated with a particular R-ACH and a given offset until the base station receives a transmission from a mobile station on the particular R-ACH and offset. In this situation, if the base station is using BPSK modulation for transmission of the power control bits, the base station will simply not transmit the modulated symbol for a given power control bit until the base station receives a transmission from a mobile station on the particular R-ACH and offset associated with the power control bit. Thus, referring to FIG. 2, the base station would not begin transmitting the corresponding power control bit until it has detected the preamble of an R-ACH transmission. The R-ACH preamble is defined, for example, in section 6.1.3.2.2.1 of the IS-95 standard.

In a small modification to the embodiment discussed in the paragraph above, the base station begins transmitting the power control bits associated with a particular R-ACH and offset at the beginning of an access channel time slot; if an access on the particular R-ACH and offset is not detected by the base station within a given interval, then the base station stops transmitting the power control bits associated with the particular R-ACH and offset. This embodiment permits the base station to indicate that the mobile station is to increase its transmit power level at the beginning of the transmission on an access channel time slot. Specifically, the base station will begin transmitting power up commands using a zero degrees phase shift at the beginning of the slot. If an access is detected, the base station will then transmit a sequence of power-up and power-down commands as needed to control the power of the accessing mobile station or stations. If an access is not detected, the base station will stop transmitting the power control bit in order to reduce its transmit power and thus increase capacity.

Using Power Control Bits for Enabling/Disabling Access to an Access Channel

In accordance with further aspects of the invention, the power control bits 120 in the power control information packet can be used for congestion control on the R-ACH, i.e., the power control bits can be used to enable/disable access on a R-ACH by a mobile station. In one such embodiment, when no mobile station is accessing a given R-ACH, the base station does not transmit the power control bit corresponding to a particular R-ACH, thus indicating that the channel is idle. When an acceptable number of mobile stations are accessing the given R-ACH, then the base station begins transmitting the power control bit associated with the given R-ACH and uses it to indicate to the mobile station(s) accessing the system that they should increase/decrease their transmission power (i.e., if the base station is using BPSK modulation for transmission of the power control bits, the base station will simply transmit a plus or minus 180 degree BPSK modulated symbol for a given power control bit.) When, for example, the given R-ACH becomes congested as a result of too many mobile stations operating on the channel, the base station does not begin or stops transmitting the power control bit associated with the given R-ACH to indicate to the mobile stations that they are to cease transmitting on the R-ACH. This aspect of the invention can be easily extended to the case where each R-ACH is divided by multiple offsets (as shown in FIG. 3). In this case, when no mobile station is accessing a given R-ACH using a given offset, the base station does not transmit the power control bit corresponding to particular R-ACH and offset thus indicating that the R-ACH and offset are idle. When an acceptable number of mobile station(s) are accessing the given R-ACH and offset, then the base station begins transmitting the power control bit associated with the given R-ACH and offset, and uses it to indicate to the mobile station(s) accessing the system that they should increase/decrease their transmission power. When the given R-ACH and offset become congested as a result of too many mobile stations operating on the R-ACH and offset, the base station stops transmitting the power control bit associated with the given R-ACH and offset to indicate to the mobile stations that they are to cease transmitting on the R-ACH and offset.

Figure 7:
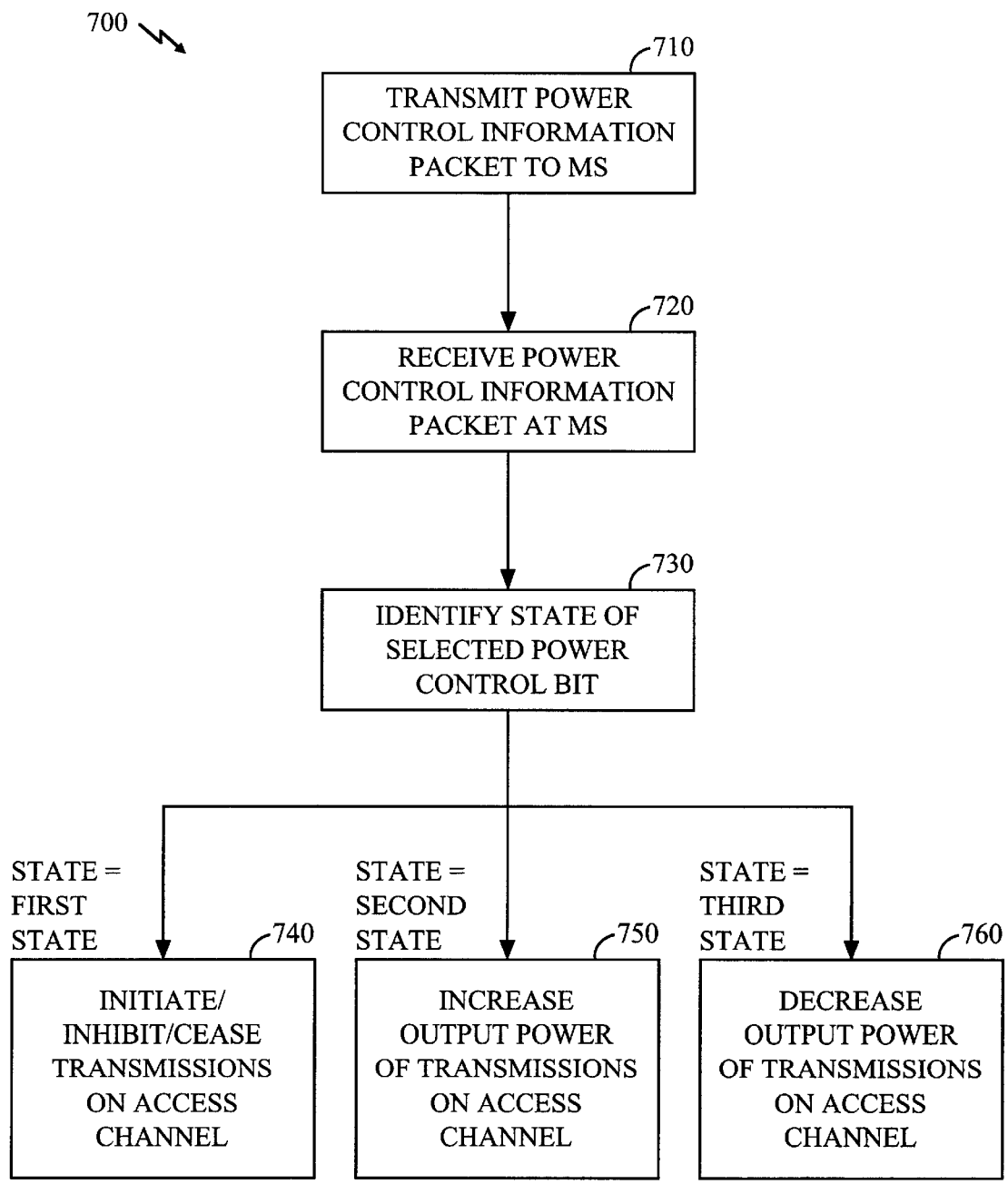
FIGS. 7, 7A, 8 and 8A are flow diagrams of systems for regulating access to an access channel using a power control bit that is capable of assuming three different states, in accordance with the present invention.
Figure 7A:
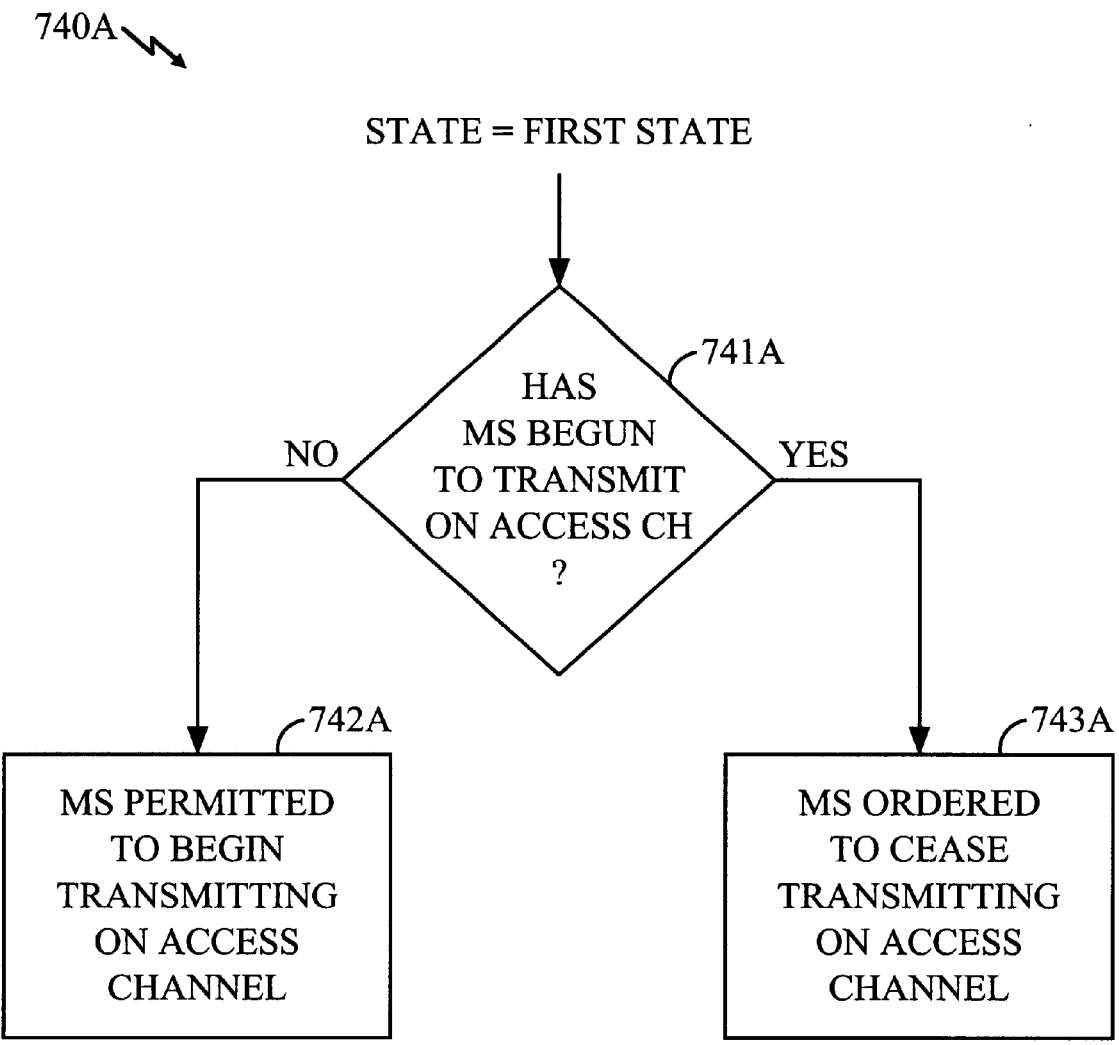

The embodiments discussed in the paragraph above are shown generally in FIGS. 7 and 7A, which depict a flow diagram of a system for regulating access to an access channel using a power control bit that is capable of assuming three different states. In step 710, a power control information packet formed from a plurality of power control bits is transmitted from the base station to one or more mobile stations. The power control bits in the power control information packet are transmitted using a modulation comprised of OOK and BPSK that permits each of the power control bits to assume one of first, second and third different states (i.e., state 1=off degrees, state 2=0 degrees, and state 3=180 degrees). In step 720, the power control information packet is received at a mobile station, and in step 730 mobile station then identifies the state of the power control bit associated with a given access channel. In step 740, one of first, second or third operations is then performed at the mobile station if the state of the power control bit corresponds to the first state, wherein the first operation corresponds to initiating the transmission of message information from the mobile station to the base station on the given access channel, the second operation corresponds to inhibiting the initiation of transmission of message information from the mobile station to the base station on the given access channel, and the third operation corresponds to ceasing the transmission of message information from the mobile station to the base station on the given access channel. In the preferred embodiment shown in FIG. 7A (labeled steps 741a–743a), if the power control bit is in the first state (not transmitted) and the mobile station has not yet begun to transmit on the given access channel, then in step 742a the mobile station is permitted to access the channel; otherwise, the mobile station is ordered to cease transmitting on the given access channel (step 743a). Referring again to FIG. 7, if the mobile station is engaged in transmissions on the given access channel and the base station transmits the power control bit for the channel in its second or third state, then the output power level of the mobile station on the access channel is increased if the state of the power control bit corresponds to the second state (step 750), and the output power level of the mobile station on the access channel is decreased if the state of the power control bit corresponds to the third state (step 760).

As indicated previously, certain alternatives of this invention do not require the base station to transmit during the preamble portion of the access channel transmission. Thus, in the preferred embodiment shown in FIG. 7A (labeled steps 741*a*–743*a*), if the power control bit is in the first state (the power control bit is not transmitted) and the mobile station has not yet begun to transmit on the given access channel, then in step 742*a* the mobile station is permitted to access the channel; if the power control bit is in the first state (the power control bit is not transmitted) and the mobile station has is transmitting the preamble on the given access channel, then in step 742*a* the mobile station is permitted to continue transmitting on the given access channel; otherwise, the mobile station is ordered to cease transmitting on the given access channel (step 743*a*). Referring again to FIG. 7, if the mobile station is engaged in transmissions on the given access channel and the base station transmits the power control bit for the channel in its second or third state, then the output power level of the mobile station on the access channel is increased if the state of the power control bit corresponds to the second state (step 750), and the output power level of the mobile station on the access channel is decreased if the state of the power control bit corresponds to the third state (step 760).

Figure 4:
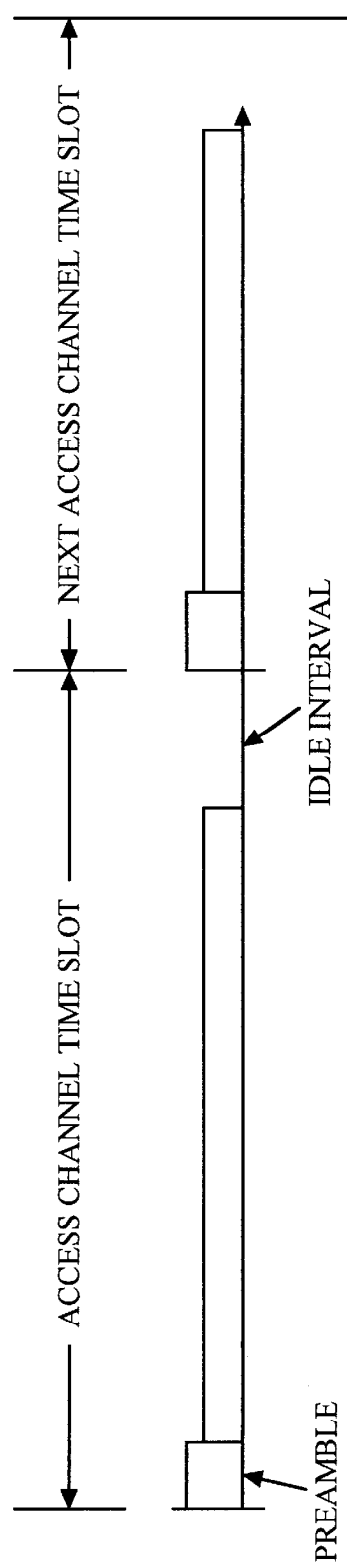
FIG. 4 is a diagram showing the structure of an access channel time slot having an idle interval, in accordance with the present invention.
Figure 8:
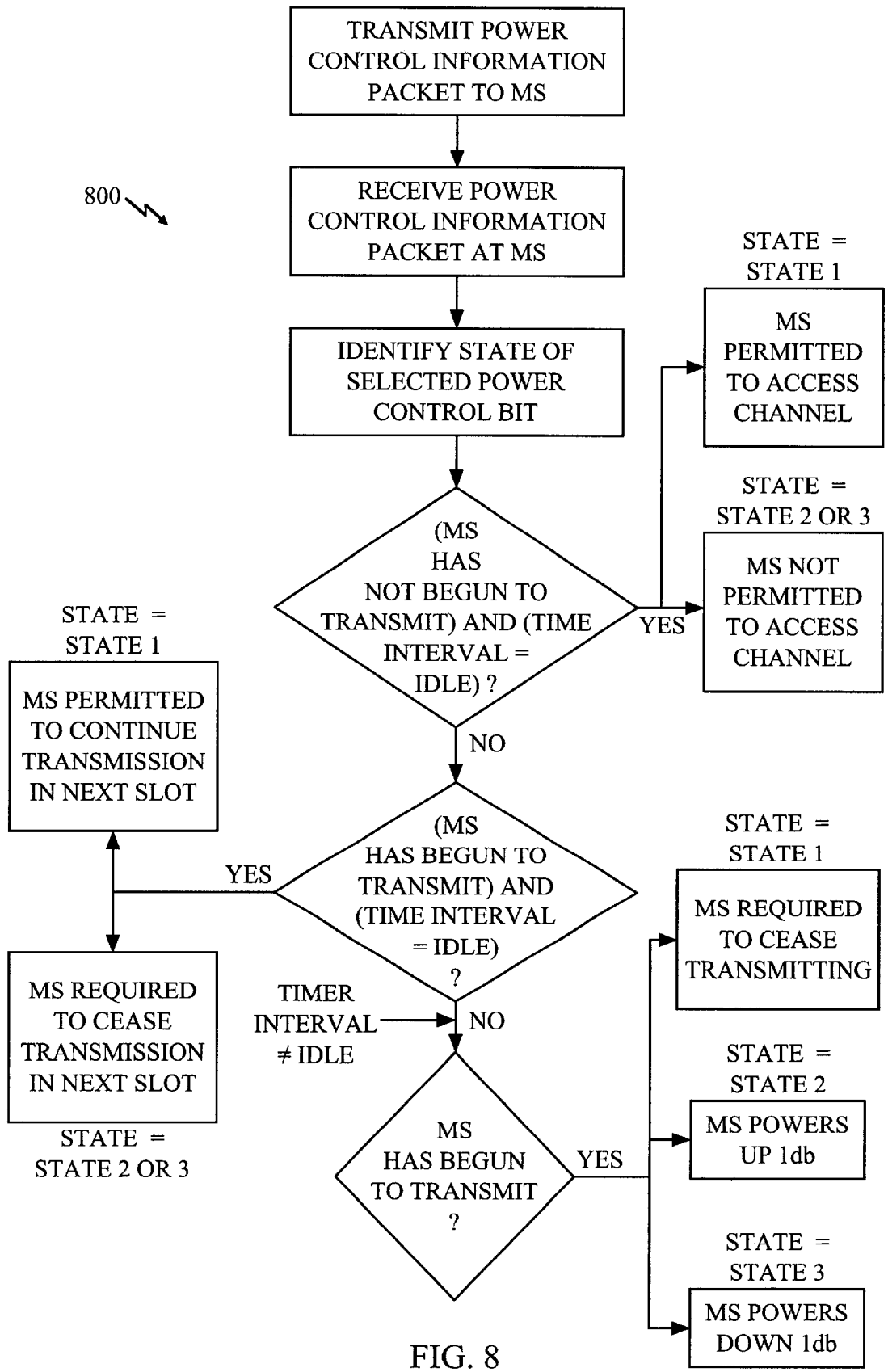
Figure 8A:
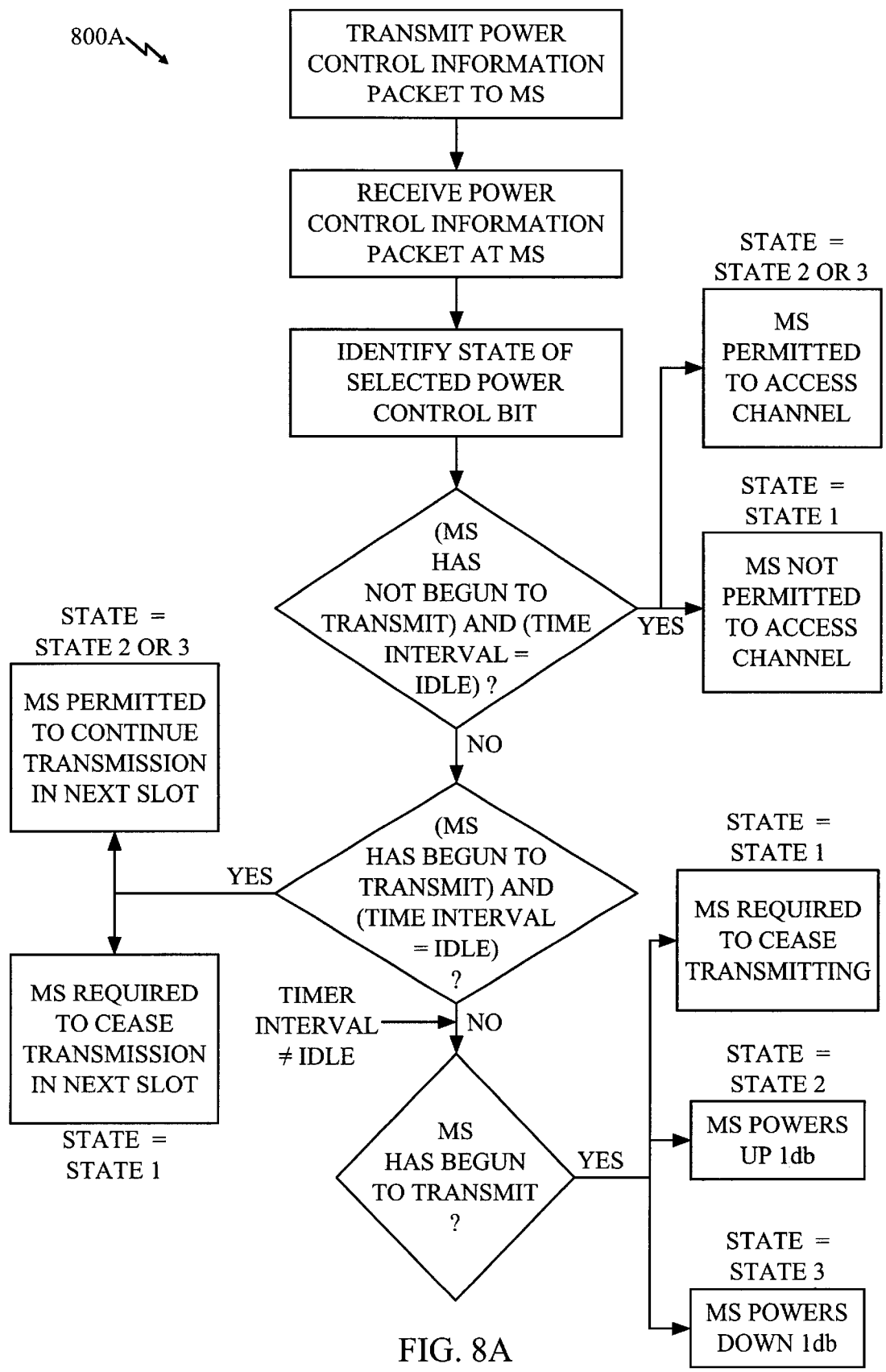

Referring now to FIG. 4, in accordance with yet a further aspect, a small idle interval is preferably included at the end of each access channel time slot in order for the base station to be able to turn off the power control bits, thus indicating that the channel is idle and mobile stations can access the channel in the next slot. If the base station does not turn off the power control bit corresponding to the channel during this idle interval, then the mobile stations are not permitted to transmit during the next slot. In this embodiment, the base station normally will not transmit the power control bit for a given R-ACH during the idle interval signaling to the mobile stations that it is acceptable to access the R-ACH during the next slot. If one or more mobile stations begin to access the R-ACH during the next access channel time slot, then the base station will begin to transmit power control bits corresponding to the R-ACH (e.g., the base station will transmit zero or 180 degree BPSK symbols for the power control bit), thus causing the mobile station to increase or decrease its transmission power. Referring still to FIG. 4, in a situation in which the base station did not desire to permit access to the R-ACH or in a situation where the base station wanted one or more mobile stations to cease transmitting on the R-ACH, the base station would transmit power control bits (e.g., the base station will transmit zero or 180 degree BPSK symbols for the power control bit) during the idle interval—thus indicating to the mobile stations that they are not to access the R-ACH during the following slot. This embodiment of the invention is shown generally in FIG. 8. A further alternative embodiment is shown in FIG. 8A. The embodiment of FIG. 8A is otherwise identical to that of FIG. 8, except in FIG. 8A the base transmits power control bits during the idle interval in order to indicate that mobile stations are permitted to access the R-ACH during the next time slot.

The idle interval used with the embodiment discussed above should preferably be at least be several power control information packets in length plus some allowed processing time before the succeeding access channel time slot so that the mobile station can determine whether it is allowed to transmit or not during the slot. This preferred length results from the fact that a single power control bit is not encoded with error correction or detection information and is transmitted at a relatively low power to enhance system capacity. Thus, a single power control bit is not very reliable in its transmission. This is quite acceptable for the usage of power control during ongoing transmission of message information (i.e., within the middle of an access channel time slot) because, although a single bit error during this period will cause the mobile station to change its power in the wrong direction, this error will be quickly corrected by a succeeding power control bit. However, since the mobile station cannot reliably detect whether a single power control bit is transmitted, several power control bits corresponding to a given R-ACH should be accumulated during the idle interval in order to reliably determine whether the mobile station is permitted access to the R-ACH or is being ordered to cease transmissions on the R-ACH.

Figure 5:
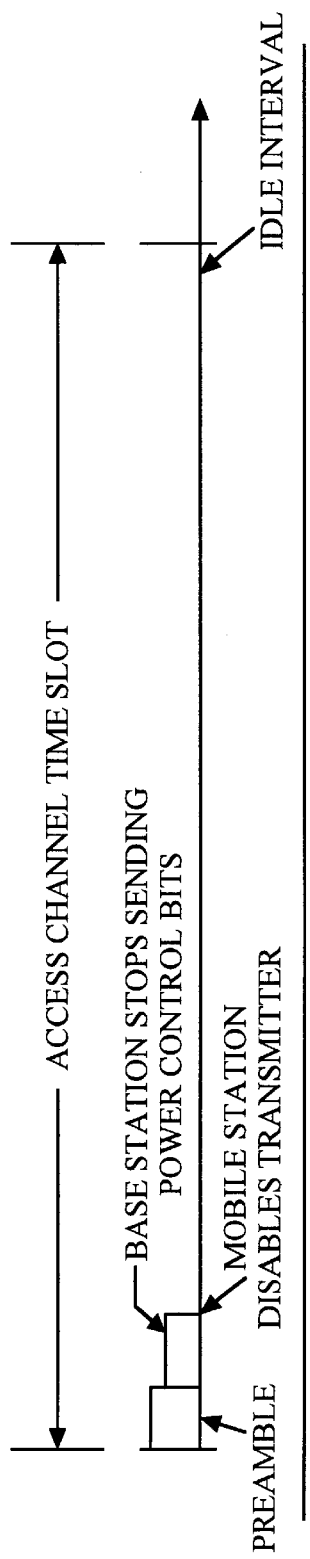
FIG. 5 is a timing diagram showing a method for disabling access by a mobile station to an access channel, in accordance with the present invention.

In accordance with yet a further aspect of the invention, FIG. 5 illustrates a system for disabling accesses to a R-ACH during the middle of an access control slot. Where there are more accesses to a given R-ACH in an access channel time slot than the base station desires to process, the base station preferably turns off the power control bits corresponding to the R-ACH after some time interval T in the middle of the time slot. The time interval T is the time required by the base station to determine that there are more accesses than desired. After accumulating several of such bits, the mobile station determines that the base station is not transmitting power control bits corresponding to the R-ACH and the mobile station disables its transmissions on the R-ACH (during the middle of the time slot).

It should be noted that in an alternative embodiment, the idle interval can be during the transmission of the preamble, thus not requiring any dead time on the channel. In this case, the base station does not transmit during the preamble to signal to the mobile station that it may transmit. However, this embodiment has the disadvantage that mobile stations cannot be power controlled during the preamble. A further alternative is to have the mobile stations transmit during the preamble if the mobile stations are allowed to access the system. Thus, a base station not transmitting during the preamble is an indication to the mobile stations that they are not permitted to transmit during the time slot.

The embodiment described above use three states of a single power control bit: off, increase power, and decrease power. In addition, the transmission of a power control bit at different times indicates whether a given R-ACH is idle and mobile stations can access the R-ACH, whether mobile stations are not permitted to access the R-ACH, and whether mobile stations are to stop transmitting on the R-ACH. In the embodiments discussed above, BPSK modulation was used to achieve these three states with a single power control bit as described above. It should be noted that other modulation schemes can be used to indicate these various states. For example, each power control bit can be encoded using QPSK modulation. This provides up to 4 different indications. It will be understood by those skilled in the art that other modulation schemes could alternatively be used to encode the power control bit. In a further alternative embodiment, a single power control bit can be used to govern all R-ACH's and will indicate whether any mobile station is permitted to access the system. This single bit can be used to govern all R-ACHs. This approach can be used to avoid the use of the idle time described above.

Re-using Power Control Bits

FIG. 3 (described above) showed an arrangement using staggered R-ACHs. With these staggered R-ACHs, a power control bit could be assigned (or mapped) to each staggered slot for each R-ACH. In accordance with a further aspect of the invention, power control bits that are not used for one staggered time slot (i.e., a time slot associated with a particular offset) are available to be reused for controlling access on a subsequent staggered slot (i.e., a time slot associated with a later offset).

Figure 6:
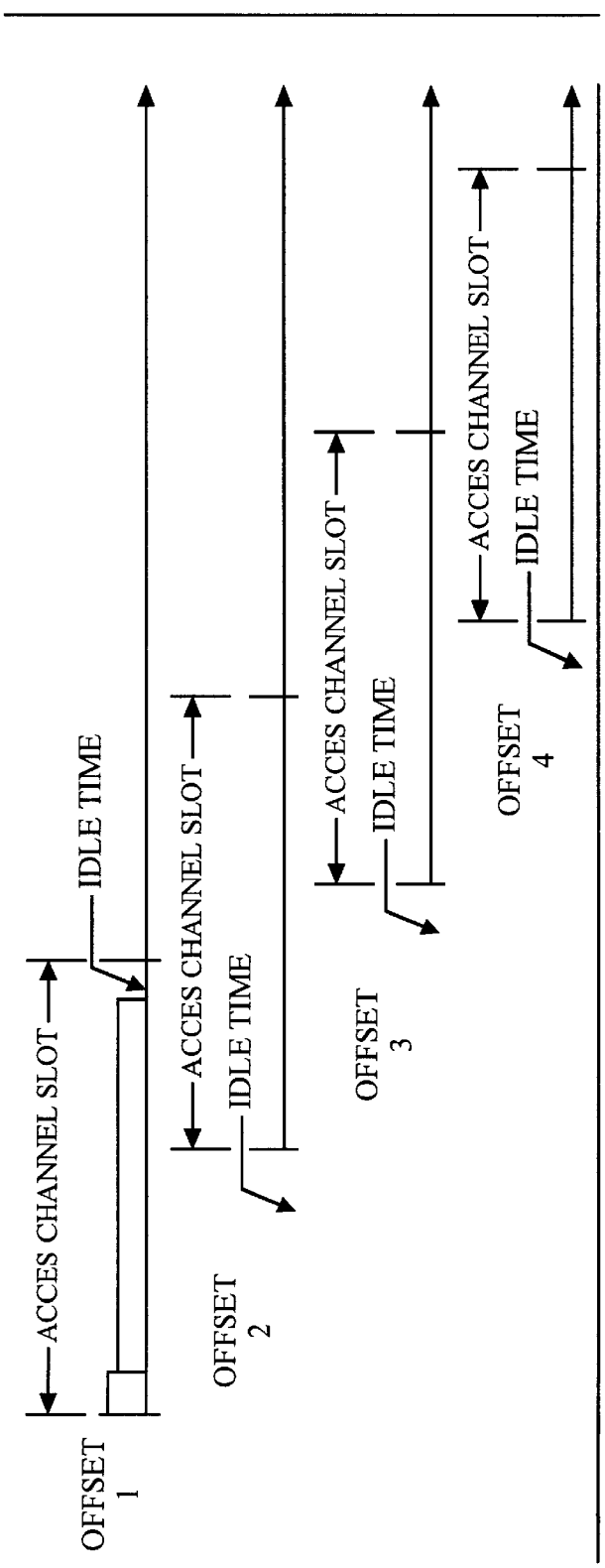
FIG. 6 is a timing diagram showing several staggered access channel time slots each of which has an idle time period associated therewith for regulating access to the various staggered access channel time slots, in accordance with the present invention.
Figure 9:
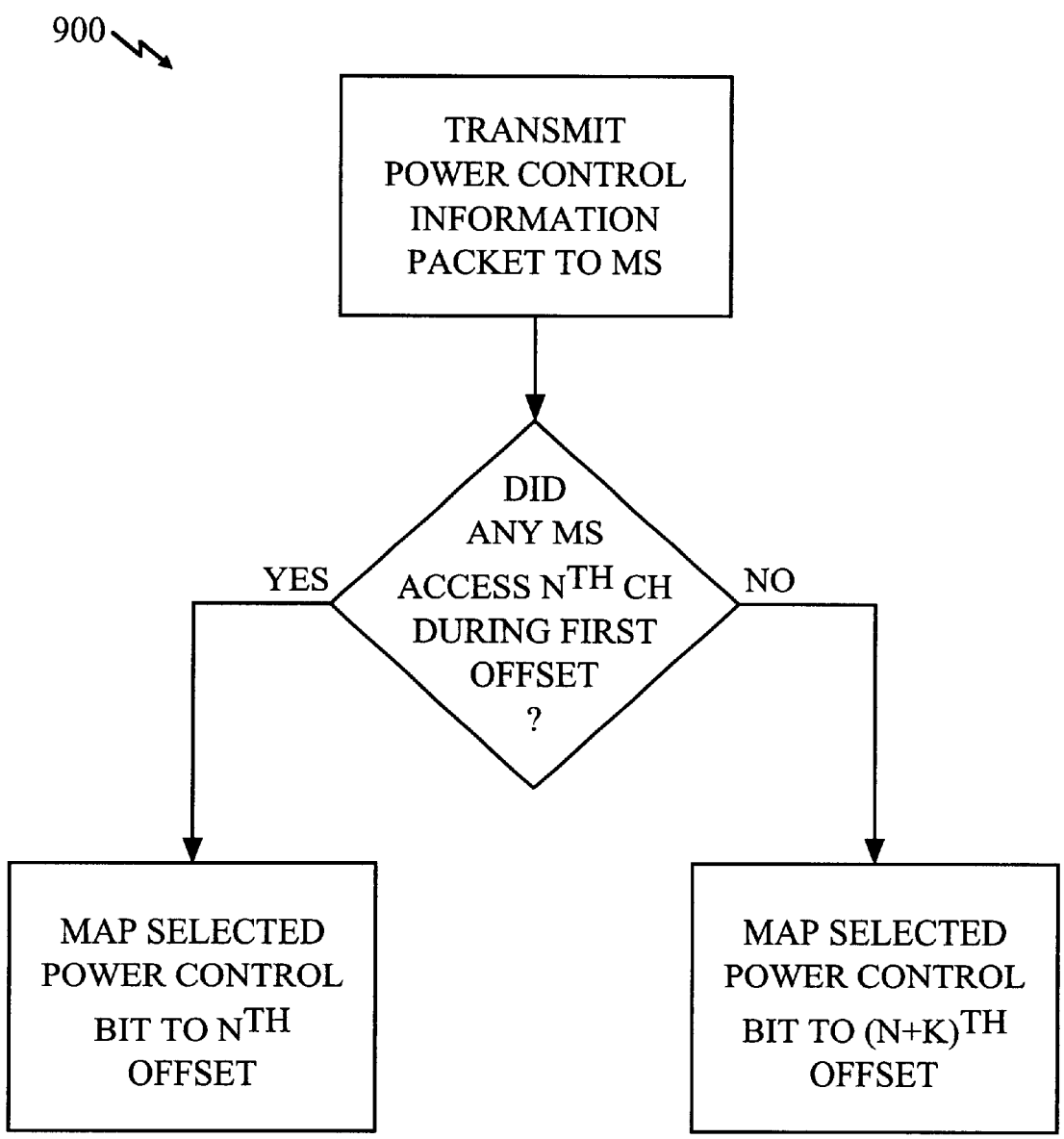
FIG. 9 is a flow diagram of a system for re-using power control bits, in accordance with the present invention.

FIG. 6 shows a case where there are two power control bits for each R-ACH and four possible starting times for that R-ACH (i.e., each R-ACH has four associated time offsets, namely, offset 1, offset 2, offset 3 and offset 4). Initially, power control bits 1 and 2 for a given R-ACH are assigned to offset 1 and offset 2 of the R-ACH, respectively. If a mobile station accesses the given R-ACH during the time interval corresponding to offset 1, then power control bit 1 is used for offset 1 of the given R-ACH. Alternatively, if a mobile station does not access the given R-ACH in the time interval corresponding to offset 1, then power control bit 1 is used to control transmissions beginning on offset 3 associated with the R-ACH. Similarly, the power control bit that is used for offset 2 can be used for offset 4 if there wasn't an access of the R-ACH during offset 2. In accordance with this aspect of the invention, a mobile station desiring to access the given R-ACH at offset 2 will check during the idle time for offset 2 to determine whether the power control bit corresponding to offset 2 is being transmitted. If the power control bit is being transmitted (e.g., if the base station is transmitting zero or 180 degree BPSK symbols for the power control bit), then the mobile station will not access during offset 2. This is just an extension of the rule described previously, namely, if the power control bit is not being transmitted, then the mobile station is permitted to access during offset 2. The power control bit re-use method described above is shown generically in the form of a flow diagram in FIG. 9.

Soft Handoff of an Access Control Channel

In CDMA systems that function in accordance with the IS-95 standard, an R-ACH is received by a single base station. Accordingly, in such systems several base stations will not receive the R-ACH from a particular mobile station in a soft handoff manner (i.e., a make-before-break handoff), such as is done on a CDMA Traffic Channel when a mobile station moves from a first base station to a second base station. Details of an exemplary CDMA system implementing a soft-handoff on a CDMA Traffic Channel are set forth in U.S. Pat. No. 5,101,501 entitled "Method and Apparatus for Providing A Soft Handoff In A Communications In A CDMA Cellular Telephone System", assigneed to the assignee of the present invention and incorporated herein in its entirety by reference. Although a soft-handoff of of the R-ACH is not prohibited by the IS95 standard, it is not known to have been implemented. There are two disadvantages to not implementing soft handoff on the R-ACH. The first is that site diversity is not used, thus reducing the performance of the channel. The second is that reverse power control is not used from multiple sites. As a result, the mobile station will be transmitting more power than is required.

Figure 10:
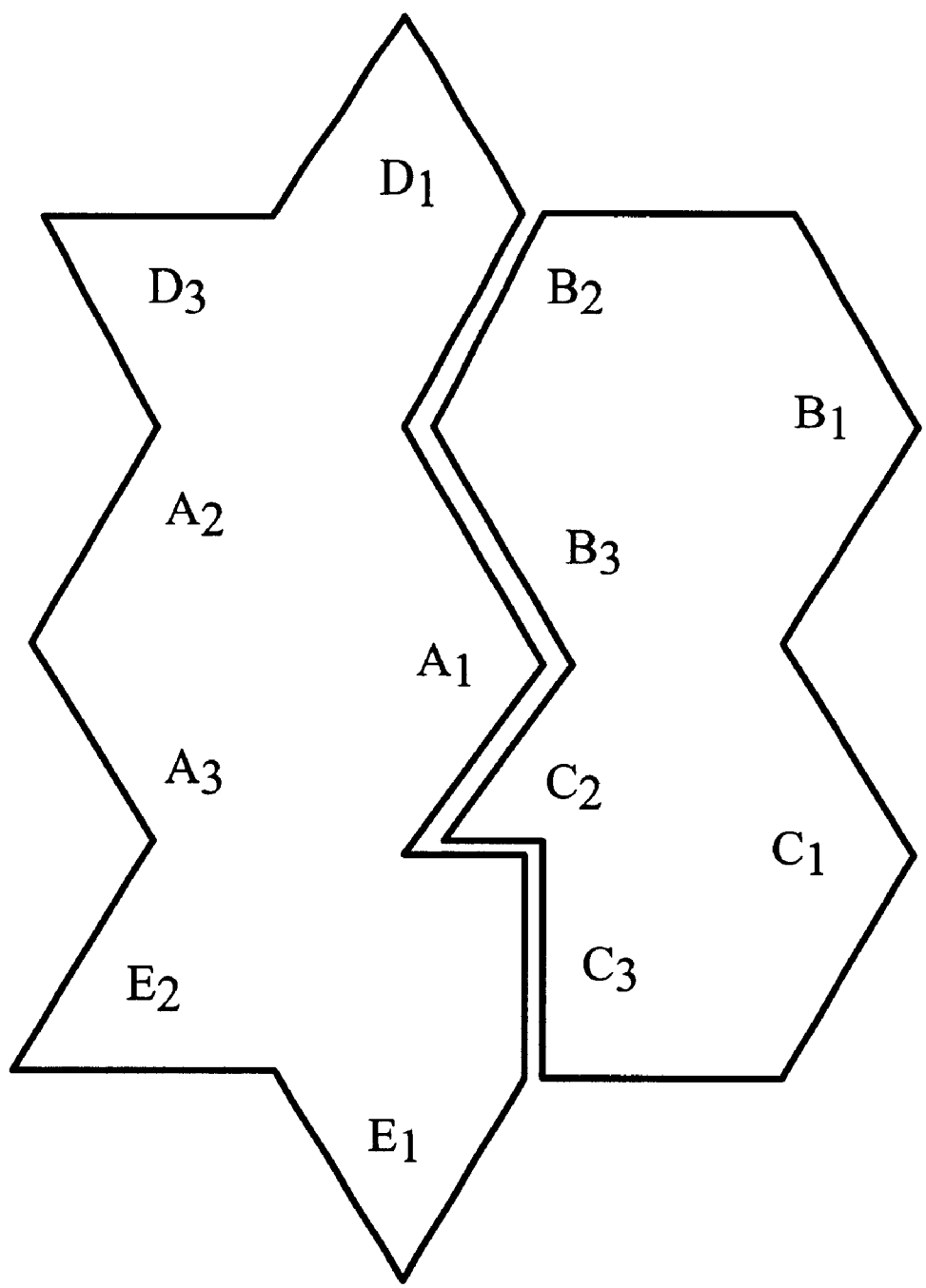
FIG. 10 is a diagram showing several cells in a cellular telephone system each of which has been divided into a plurality of segments, in accordance with the present invention.

There are several difficulties in performing soft handoff on the R-ACH. One is that since the system does not know a-priori which base stations will be needed by a mobile station accessing the system during a handoff, the system would be required to have all base stations in an area surrounding the current base station support the soft handoff. This is illustrated in FIG. 10. Consider the case of a soft handoff of an R-ACH for a mobile station in sector $A_1$. In order to complete such a handoff, sectors $B_3$. and $C_2$ would likely have to receive the R-ACH and $B_2, C_3, D_1, E_1, A_2, A_3, D_3$, and $E_2$ might receive the R-ACH for sector $A_1$. This would certainly require quite a considerable number of additional demodulators at each of these other cell sites, but it is quite possible to have demodulators for each of the sectors or some subset of them. Nonetheless, in order to obtain the full benefit this would require quite a few power control bits to be used on the forward link. However, it should be noted that additional power control bits are not required for sectors at the same site, for example, sectors $A_2$ and $A_3$. This is because the same hardware receives the R-ACH and can thus develop a single power control bit value based upon the reception at the cell site. Thus, the base station in sector $A_1$ can indicate that the power control bits are also being transmitted from other sectors by indicating such in the overhead messages along with the location of the power control bit. For example, consider the power control bit streams shown in FIGS. 11A, 11B and 11C. Here the specific R-ACH is using the power control bit in position 1 for sector $A_1$, the power control bit in position 2 for sector $B_3$ and the power control bit in position 4 for sector $C_2$. It should be noted that these power control bits will arrive at the mobile station at different times so that they will have to be deskewed. This is different than the power control bits on the Traffic Channel in a CDMA system which arrive at the mobile station at the same time from all base stations.

Figure 11A:
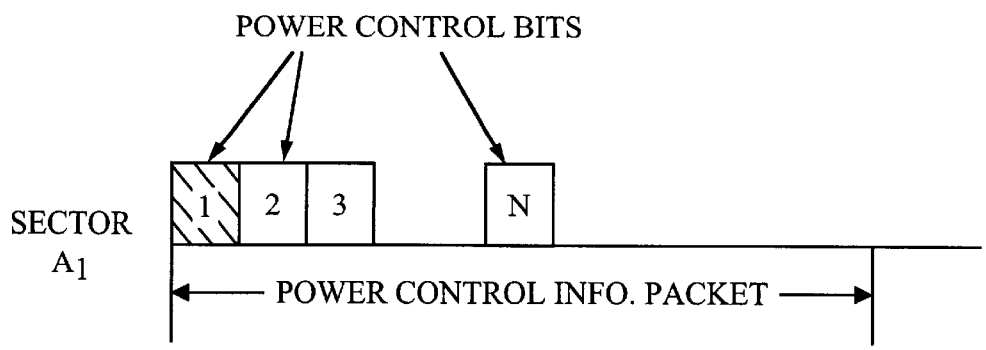
FIGS. 11A, 11B and 11C show the structure of a bit stream formed from a plurality of power control information packets that is used for handing-off access channel transmissions from a first base station to a second base station, in accordance with the present invention.
Figure 11B:
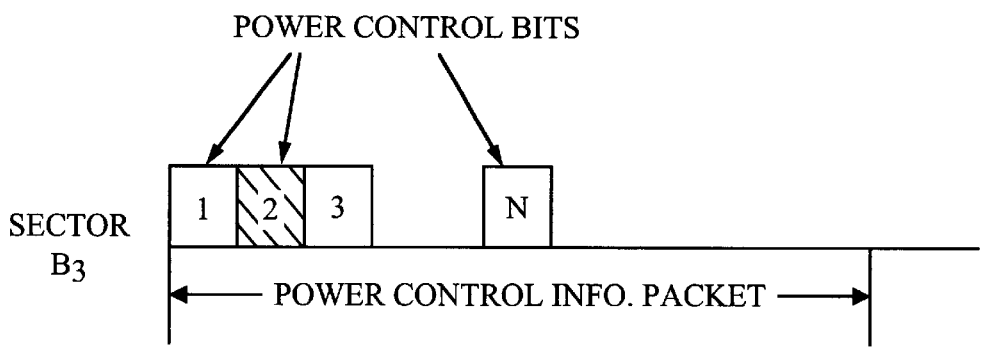
Figure 11C:
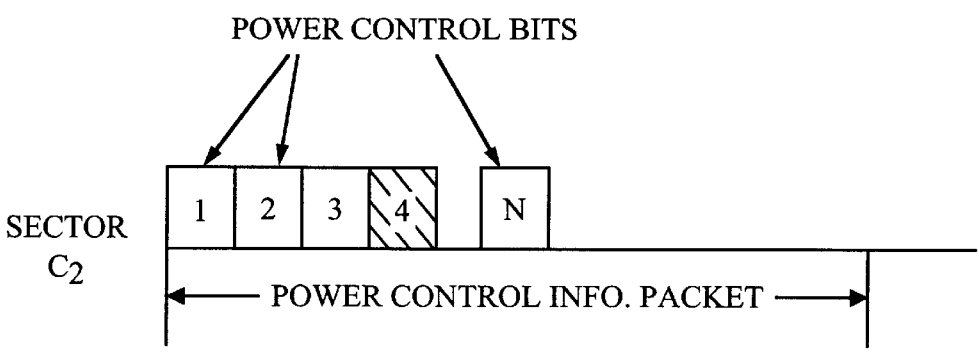
Figure 12:
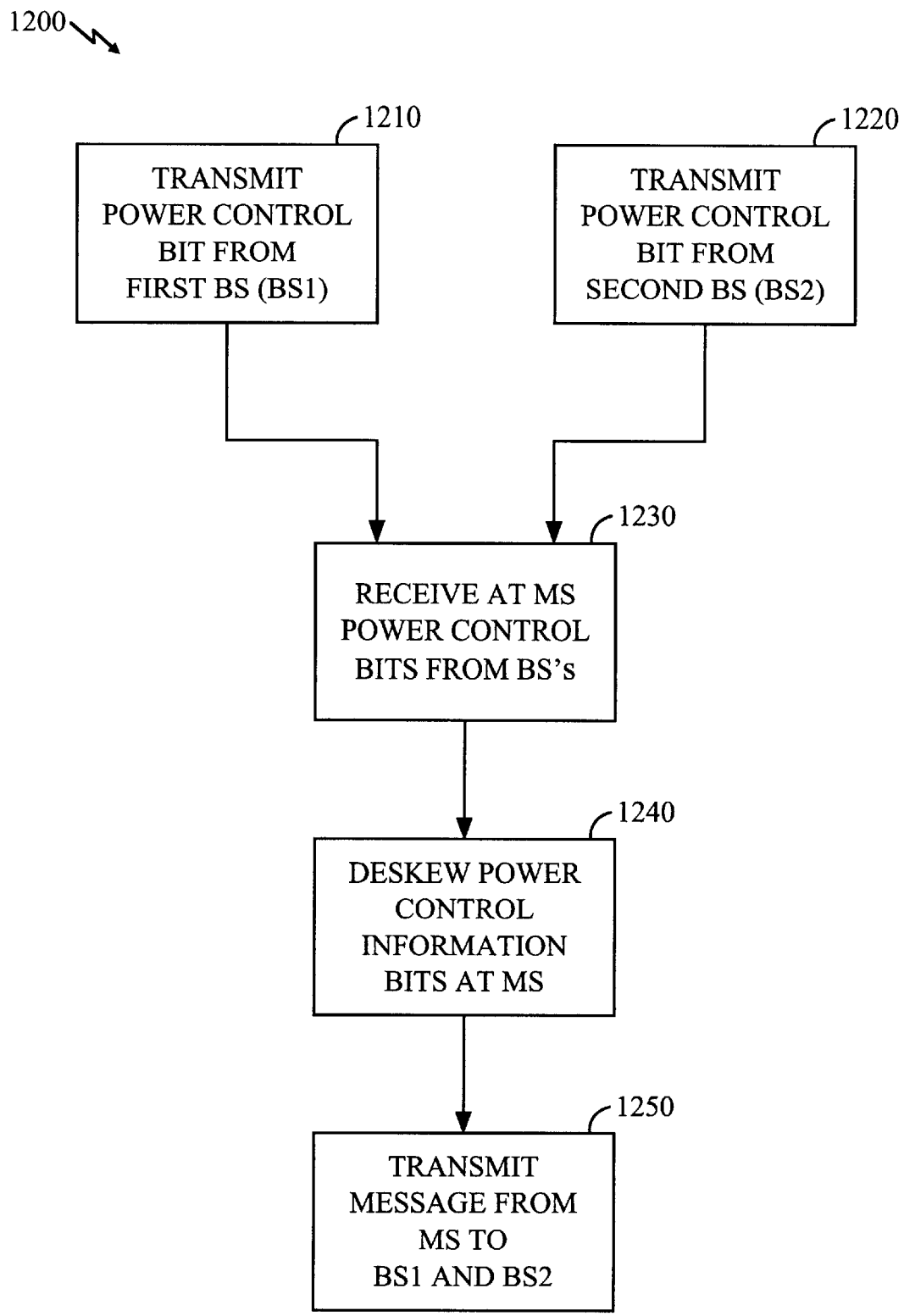
FIG. 12 is a flow diagram of a method for handing-off access channel transmissions from a first base station to a second base station, in accordance with the present invention.

Referring now to FIG. 12, there is shown a flow diagram of a method for soft handoff of an access channel, in accordance with the present invention. In step 1210, at least one power control bit from the first base station is transmitted to the mobile radio. The power control bit from the first base station is transmitted at a first time interval in the power control information packet that corresponds to that associated with the first base station. In step 1220, at least one power control bit from the second base station is also transmitted to the mobile radio unit. The power control bit from the second base station is transmitted at a second time interval in a different position in the power control information packet that corresponds to the same access channel as the first base station, but associated with the second base station. The first power control packet is transmitted from the first base station and the second power control packet is transmitted from the second base station. In step 1230, the mobile radio unit receives the power control bit from the first base station in the power control information packet (such as shown in FIG. 11A) and the power control bit from the second base station in a second power control information packet (such as shown in FIG. 11B). In step 1240, the mobile station forms a power control bit result by deskewing the bits received in step 1230.

The power control bits are handled much as described previously. However, there are several differences. In the case of the mobile station detecting whether the channel is being transmitted, in the preferred embodiment, the mobile station should individually detect whether the power control bits are being transmitted on each separate power control stream. This is done by looking at a sequence of bits as previously described. If all base stations indicate that the mobile station is allowed to transmit (by the power control bits not being transmitted), then the mobile station may enable its transmitter in the method previously described. In the preferred embodiment, mobile station is required to examine the power control stream separately from each base station. This is because a particular base station may not be able to receive the transmission from a mobile station on the R-ACH. As an example, referring to FIG. 10, a mobile station may be close to the center of the cell covered by base station A2 and thus cannot be received by any other base stations (e.g., $B_3, C_2, B_2, C_3, D_1, E_1, A_2, A_3, D_3$, and $E_2$). Similarly, when the mobile station is transmitting on the R-ACH, a specific base station may not be transmitting the bit corresponding to the R-ACH, thus the mobile station will not combine the bit that is being transmitted by the base station. It should be noted that this latter consideration is somewhat different than for IS-95 systems on the Traffic Channel. In the IS-95 system, the mobile station knows for certainty the set of base stations that are transmitting on the R-ACH. However, in this case the mobile station may have to detect whether the stream is being transmitted. Once the mobile station has deskewed, the data and determined the phase of the power control bits (and whether they are being transmitted), the mobile station determines whether to increase or decrease its transmit power. This is an extension to the IS-95 method. If those base stations that are transmitting the power control bits all indicate that the mobile station is to increase its transmit power, then the mobile station increases its transmit power; if any base station that is transmitting a power control bits indicates that the mobile station is to decrease its transmit power, then the mobile station decreases its transmit power. In step 1260, the message is transmitted during the handoff from the mobile radio unit. It is received by both the first and the second base stations on the access channel.

System Details

Figure 13:
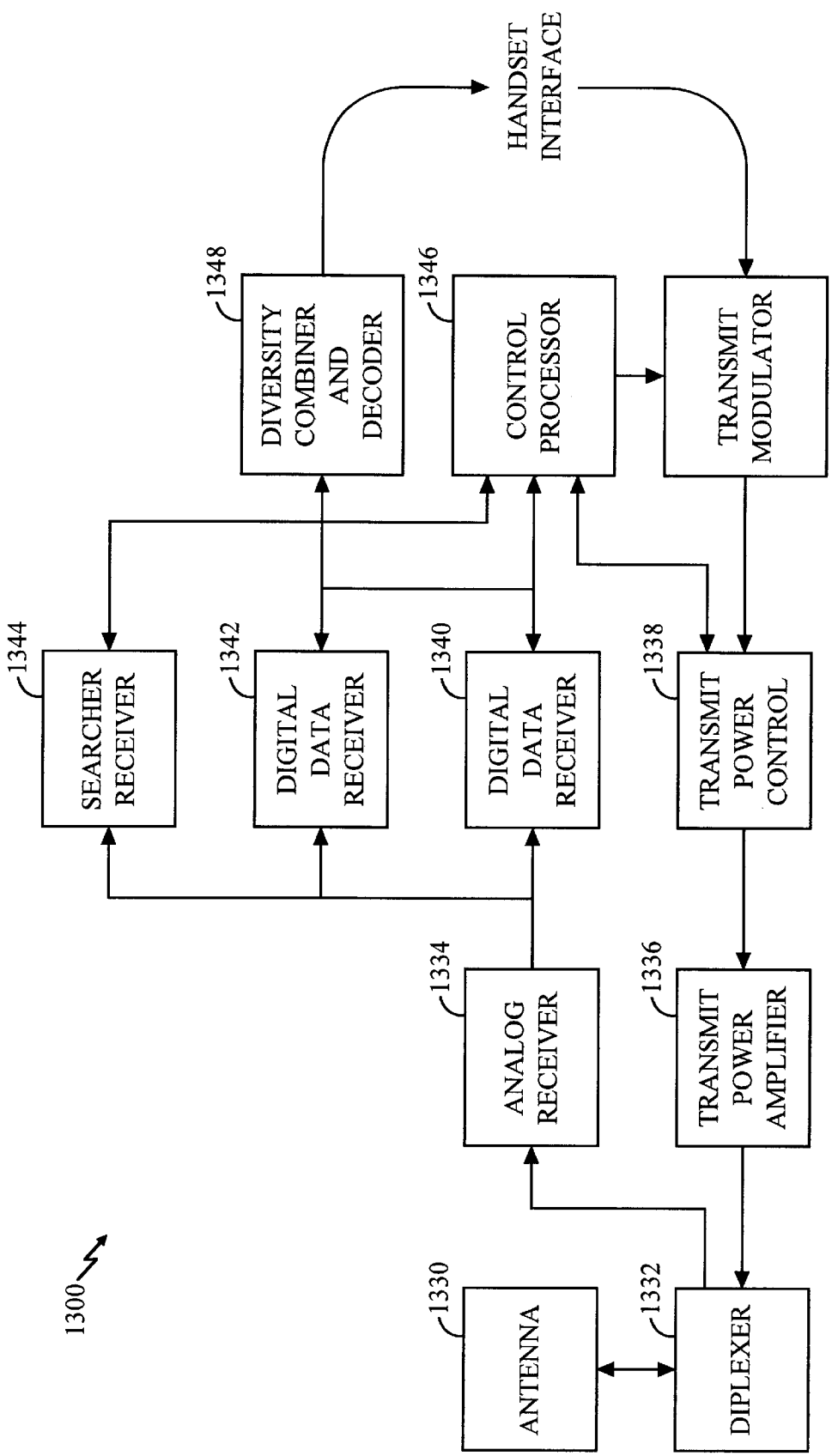
FIG. 13 is a block diagram of showing the components of an exemplary mobile station used for implementing the fast access channel power control systems of the present invention.

Referring now to FIG. 13, there is a block diagram showing the components of an exemplary mobile station 1300 used for implementing the fast access channel power control systems of the present invention. The mobile station includes an antenna 1330 which is coupled through diplexer 1332 to analog receiver 1334 and transmit power amplifier 1336. Antenna 1330 and diplexer 1332 are of standard design and permit simultaneous reception and transmission through a single antenna. Antenna 30 collects signals transmitted to the mobile station from one or more base stations and provides the signals though diplexer 1332 to analog receiver 1334. Receiver 1334 is also provided with an analog to digital converter (not shown). Receiver 1334 receives RF signals from diplexer 1332, amplifies and frequency downconverts the signals, and provides a digitized output signal to digital data receivers 1340, 1342 and to search receiver 1344. It will be understood that, although in the embodiment in FIG. 13 only two digital data receivers are shown, a low performance mobile station might have only a single digital data receiver while higher performance units will have two or more digital data receivers to permit diversity reception. The outputs of receivers 1340 and 1342 are provided to diversity and combiner circuitry 1338 which time adjusts the two streams of data received from the receivers 1340 and 1342, adds the steams together and decodes the result. Details concerning the operation of the digital data receivers 1340, 1342, the search receiver 1344, and the diversity combiner and decoder circuitry 1348 are described in U.S. Pat. No. 5,101,501 entitled "Method and Apparatus for Providing A Soft Handoff In Communications In A CDMA Cellular Telephone System", which is assigned to the assignee of the present invention and incorporated herein by reference.

An output signal is provided from the decoder 1348 to control processor 1346. In response to this output signal, the control processor 1346 determines the values of the power control bits 120 provided to the mobile station from one or more base stations. The control processor 1346 uses the received power control bits in accordance with the present invention to enable, disable and power control signals on the R-ACHs. Thus, in response to the receipt of power control bits indicating that the mobile station should either power-up or power-down (as described above), the control processor 1346 will send signals to the transmit power controller 1338 commanding controller 1338 to, for example, either increase or decrease the output power level of the transmit amplifer 1336 by either plus or minus 1 db.

Figure 14:
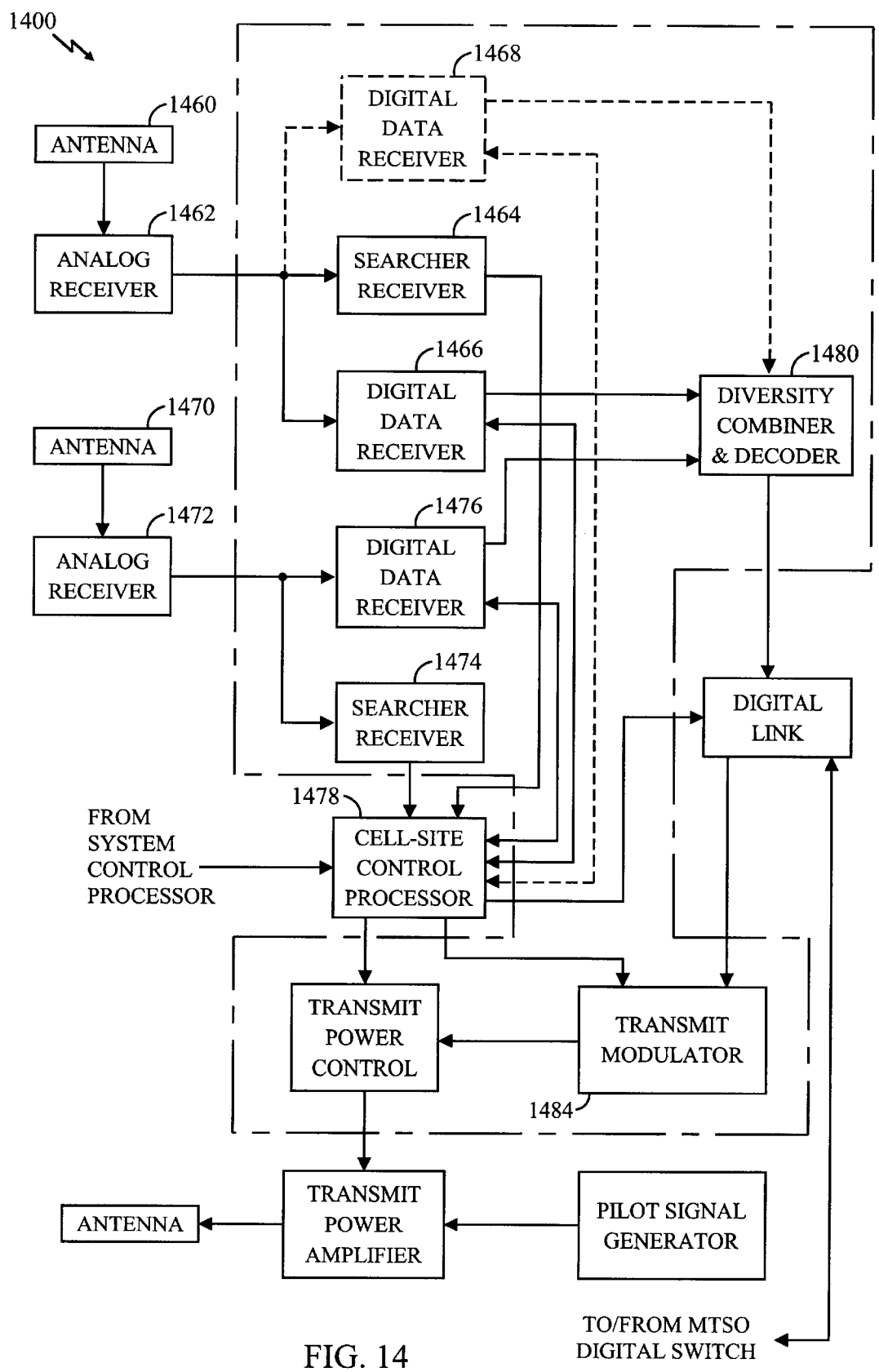
FIG. 14 is a block diagram of showing the components of an exemplary base station used for implementing the fast access channel power control systems of the present invention.

Referring now to FIG. 14, there is shown a block diagram of the components of an exemplary base station 1400 used for implementing the fast access channel power control systems of the present invention. At the base station, two receiver systems are utilized with each having a separate antenna and analog receiver for diversity reception. In each of the receiver systems, the signals are processed identically until the signals undergo a diversity combination process. The elements within the dashed lines correspond to elements corresponding to the communications between the base station and one mobile station. Referring still to FIG. 14, the first receiver system is comprised of antenna 1460, analog receiver 1462, searcher receiver 1464 and digital data receivers 1466 and 1468. The second receiver system includes antenna 1470, analog receiver 1472, searcher receiver 1474 and digital data receiver 1476. Cell-site control processor 1478 is used for signal processing and control during handoff. Both receiver systems are coupled to diversity combiner and decoder circuity 1480. A digital link 1482 is used to communicate signals from and to a mobile telephone switching office (MTSO) under the control of control processor 1478.

Signals received on antenna 1460 are provided to analog receiver 1462, where the signal are amplified, frequency translated and digitized in a process identical to that described in connection with the mobile station analog receiver. The output from the analog receiver 1462 is provided to digital data receivers 1466 and 1468 and searcher receiver 1464. The second receiver system (i.e., analog receiver 1472, searcher receiver 1474 and digital data receiver 1476) process the received signals in a manner similar to the first receiver system. The outputs of the digital data receivers 1466, 1476 are provided to diversity combiner and decoder circuitry 1480, which processes the signals in accordance with a Viterbi algorithm. Details concerning the operation of the first and second receiver systems and the diversity combiner and decoder 1480 are described in U.S. Pat. No. 5,101,501 entitled "Method and Apparatus for Providing A Soft Handoff InCommunications In A CDMA Cellular Telephone System", incorporated above. Signals for transmission to mobile units are provided to a transmit modulator 1484 under the control of processor 1478. Transmit modulator 1484 modulates the data for transmission to the intended recipient mobile station. Among other things, the data signals output from the transmit modulator 1484 will include the power control information bits 120 that are the subject of the present invention.

Although the various embodiments disclosed above have been described in connection with R-ACH channels on CDMA mobile radio systems, it will be understood by those skilled in the art that the teachings of the present invention are applicable to any mobile radio telephone system having access channels that may be accessed by multiple users.

The previous description of the preferred embodiments is provided to enable any person skilled in the art to make or use the present invention. The various modifications to these embodiments will be readily apparent to those skilled in the art, and the generic principles defined herein may be applied to other embodiments without the use of inventive faculty. Thus, the present invention is not intended to be limited to the methods and apparatuses shown herein but is to be accorded the widest scope consistent with the claims set forth below.

What is claimed is:

1. A method for controlling the transmission of signals from one or more of a plurality of mobile stations to a base station on a plurality of M multiple access channels, comprising the steps of:

(A) transmitting a power control information packet formed from a plurality of power control bits from the base station to said one or more mobile stations, wherein each of the power control bits in the power control information packet has a position that is mapped to a selected access channel and to a time offset within the selected access channel;

(B) receiving the power control information packet at a first mobile station; and (C) transmitting a message from the first mobile station to the base station on a first access channel and at a first time offset associated with the first access channel, wherein said message is transmitted from the first mobile station at a power level determined in response to a first power control bit in the power control information packet, the first power control bit is located in a first position in the power control information packet, and the first position is mapped to the first access channel and the first time offset.

2. The method of claim 1, wherein the first time offset has a duration that is greater than the largest expected multipath transmission delay associated with transmissions from the base station to the first mobile station.

3. The method of claim 1, wherein step (A) further comprises transmitting a plurality of power control information packets in series so as to form a continuous stream of power control bits.

4. The method of claim 1, wherein there are k time offsets associated with each of the M multiple access channels, and the power control information packet transmitted in step (A) is formed of M*k power control bits.

5. The method of claim 1, wherein steps (B) and (C) further comprise:

(B) receiving the power control information packet at a second mobile station; and (C) simultaneously transmitting messages from the first mobile station and the second mobile station to the base station on the first access channel and at the first time offset associated with the first access channel, wherein the messages from the first and second mobile stations are transmitted on the first access channel at power levels that are determined in response to only the first power control bit in the power control information packet.

6. The method of claim 1, wherein step (A) further comprises inhibiting transmission from the base station of the first power control bit within the power control information packet until the base station begins receiving transmissions from the first mobile station on the first access channel and at the first time offset associated with the first access channel.

7. The method of claim 1, wherein step (A) further comprises inhibiting transmission from the base station of the first power control bit within the power control information packet if the base station fails to receive, during a time interval corresponding to the first time offset, transmissions from the first mobile station at the first time offset on the first access channel.

8. The method of claim 1, wherein each power control bit in the power control information packet is transmitted in step (A) using a modulation that permits each of the power control bits to assume one of three different states.

9. The method of claim 8, wherein the three different states correspond to a first state that conveys a power UP command to a mobile station, a second state that conveys a power DOWN command to the mobile station, and a third state that indicates that no power control command was transmitted to the mobile station by the base station.

10. The method of claim 9, wherein said first power control bit is transmitted in said first state when said base station is not receiving transmissions on said first time offset on said first access channel.

11. The method of claim 9, wherein step (C) further comprises the step of raising said power level by 1 dB if the first power control bit is in the first state and lowering said power level by 1 dB if the first power control bit is in the second state.

12. The method of claim 9, wherein said modulation corresponds to BPSK modulation.

13. The method of claim 1, wherein each power control bit in the power control information packet is transmitted in step (A) using a modulation that permits each of the power control bits to assume one of four different states.

14. The method of claim 13, wherein the four different states correspond to a first state that conveys a power UP command to a mobile station, a second state that conveys a power DOWN command to the mobile station, a third state that conveys to the mobile station that the mobile station is transmitting at a target power level, and a fourth state that indicates that no power control command was transmitted to the mobile station by the base station.

15. The method of claim 14, wherein said first power control bit is transmitted in said first state when said base station is not receiving transmissions on said first time offset on said first access channel.

16. The method of claim 14, wherein step (C) further comprises the step of raising said power level by 1 dB if the first power control bit is in the first state, lowering said power level by 1 dB if the first power control bit is in the second state, and maintaining said power level unchanged if the first power control bit is in the third state.

17. The method of claim 13, wherein said modulation corresponds to QPSK modulation.

18. The method of claim 13, wherein the four different states correspond to a first state that conveys a power UP BIG command to a mobile station, a second state that conveys a power DOWN BIG command to the mobile station, a third state that conveys a power UP SMALL command to a mobile station, a fourth state that conveys a power DOWN SMALL command to the mobile station.

19. The method of claim 18, wherein step (C) further comprises the step of raising said power level by more than 1 dB if the first power control bit is in the first state, lowering said power level by more than 1 dB if the first power control bit is in the second state, raising said power level by only 1 dB if the first power control bit is in the third state, and lowering said power level by only 1 dB if the first power control bit is in the fourth state.

20. The method of claim 18, wherein said modulation corresponds to QPSK modulation.

21. A method for controlling the transmission of signals from two or more of a plurality of mobile stations to a base station on a plurality of M multiple access channels, comprising the steps of:

(A) transmitting a power control information packet formed from a plurality of power control bits from the base station to said one or more mobile stations, wherein each of the power control bits in the power control information packet has a position that is mapped to a selected access channel;

(B) receiving the power control information packet at a first mobile station and a second mobile station; and (C) simultaneously transmitting messages from the first mobile station and the second mobile station to the base station on a first access channel, wherein the messages from the first and second mobile stations are transmitted on the first access channel at power levels that are determined in response to only a first power control bit in the power control information packet, wherein the first power control bit is located in a first position in the power control information packet, and the first position is mapped to the first access channel.

22. The method of claim 21, wherein step (A) further comprises transmitting a plurality of power control information packets in series so as to form a continuous stream of power control bits.

23. The method of claim 21, wherein step (A) further comprises inhibiting transmission from the base station of the first power control bit within the power control information packet until the base station begins receiving transmissions from a mobile station on the first access channel.

24. The method of claim 21, wherein step (A) further comprises inhibiting transmission from the base station of the first power control bit within the power control information packet if the base station fails to receive, during a time interval corresponding to the first time offset, transmissions on the first access channel.

25. The method of claim 21, wherein each power control bit in the power control information packet is transmitted in step (A) using a modulation that permits each of the power control bits to assume one of three different states.

26. The method of claim 25, wherein said modulation corresponds to BPSK modulation.

27. The method of claim 21, wherein each power control bit in the power control information packet is transmitted in step (A) using a modulation that permits each of the power control bits to assume one of four different states.

28. The method of claim 27, wherein said modulation corresponds to QPSK modulation.

29. A method for controlling the transmission of signals from one or more of a plurality of mobile stations to a base station on one or more of a plurality of multiple access channels, comprising the steps of:
  (A) transmitting a power control information packet formed from a plurality of power control bits from the base station to said one or more mobile stations, wherein the power control bits in the power control information packet are transmitted using a modulation that permits each of the power control bits to assume one of first, second and third different states;
  (B) receiving the power control information packet at a first mobile station;
  (C) identifying, at the first mobile station, a state of a first power control bit associated with a first access channel;
  (D) performing one of first, second or third operations with said first mobile station if said state of said first power control bit corresponds to said first state;
    wherein said first operation corresponds to initiating the transmission of message information from the first mobile station to the base station on the first access channel, the second operation corresponds to inhibiting the initiation of transmission of message information from the first mobile station to the base station on the first access channel; and the third operation corresponds to ceasing the transmission of message information from the first mobile station to the base station on the first access channel;
  (E) increasing an output power level of the first mobile station on the first access channel if the state of the first power control bit corresponds to said second state; and
  (F) decreasing the output power level of the first mobile station on the first access channel if the state of the first power control bit corresponds to said third state.

30. The method of claim 29, wherein the first power control bit in the power control information packet is transmitted in step (A) in said first state until the first mobile station begins transmitting on the first access channel, wherein said first state is used to indicate an idle condition on the first access channel until the first mobile station begins transmitting on the first access channel.

31. The method of claim 30, wherein the first power control bit in the power control information packet is transmitted in step (A) in said second or third state after the first mobile station begins transmitting on the first access channel, wherein the second state indicates that the first mobile station should increase said output power level, and the third state indicates that the first mobile station should decrease said output power level.

32. The method of claim 31, wherein, after the first mobile station begins transmitting on the first access channel, the first power control bit in the power control information packet is again transmitted in step (A) in said first state, wherein said first state is used after the first mobile station has begun transmissions on the first access channel to indicate that the first mobile station should cease transmissions on the first access channel.

33. The method of claim 32, wherein said state of said first power control bit is used to indicate whether any one of said plurality of mobile stations are permitted access to any one of said plurality of access channels.

34. The method of claim 29, further comprising the step of transmitting message information on the first access channel in a series of time slots, each of the time slots including an idle interval, wherein the first power control bit is transmitted in step (A) in said first state during the idle interval until the first mobile station begins transmitting on the first access channel, wherein said first state is used during the idle interval to indicate an idle condition on the first access channel until the first mobile station begins transmitting on the first access channel.

35. The method of claim 34, wherein the idle interval is at the end of each of the time slots.

36. The method of claim 34, wherein the idle interval occurs during transmission of a message preamble transmitted at a start of each of the time slots.

37. The method of claim 34, wherein the first power control bit in the power control information packet is transmitted in step (A) in said second or third state after the first mobile station begins transmitting on the first access channel, wherein the second state indicates that the first mobile station should increase said output power level, and the third state indicates that the first mobile station should decrease said output power level.

38. The method of claim 37, wherein, after the first mobile station begins transmitting on the first access channel, the first power control bit in the power control information packet is again transmitted in step (A) during the idle interval in said first state, wherein said first state is used after the first mobile station has begun transmissions on the first access channel to indicate that the first mobile station may continue transmissions on the first access channel.

39. The method of claim 37, wherein, after the first mobile station begins transmitting on the first access channel, the first power control bit in the power control information packet is again transmitted in step (A) during the idle interval in said second or third state, wherein said second and third states are used after the first mobile station has begun transmissions on the first access channel to indicate that the first mobile station must cease transmissions on the first access channel.

40. The method of claim 39, wherein said idle interval has a duration that is long enough to permit the first mobile station to determine whether it must cease transmissions on the first access channel prior to initiation of a next time slot.

41. The method of claim 29, further comprising the step of transmitting message information on the first access channel in a series of time slots, each of the time slots including an idle interval, wherein the first power control bit is transmitted in step (A) in said second or third state during the idle interval until the first mobile station begins transmitting on the first access channel, wherein, prior to the first mobile station beginning transmissions on the first access channel, said second and third states are used during the idle interval to indicate that the first mobile station is permitted to access the first access channel.

42. The method of claim 41, wherein the idle interval is at the end of each of the time slots.

43. The method of claim 41, wherein the idle interval occurs during transmission of a message preamble transmitted at a start of each of the time slots.

44. The method of claim 41, wherein the first power control bit in the power control information packet is transmitted in step (A) in said second or third state after the first mobile station begins transmitting on the first access channel, wherein, after the first mobile station begins transmissions on the first access channel, the second state indicates that the first mobile station should increase said output power level, and the third state indicates that the first mobile station should decrease said output power level.

45. The method of claim 44, wherein, after the first mobile station begins transmitting on the first access channel, the first power control bit in the power control information packet is again transmitted in step (A) during the idle interval in said second or third state, wherein said second or third state is used after the first mobile station has begun transmissions on the first access channel to indicate that the first mobile station may continue transmissions on the first access channel.

46. The method of claim 44, wherein, after the first mobile station begins transmitting on the first access channel, the first power control bit in the power control information packet is transmitted in step (A) during the idle interval in said first state, wherein said first state is used after the first mobile station has begun transmissions on the first access channel to indicate that the first mobile station must cease transmissions on the first access channel.

47. The method of claim 44, wherein said idle interval has a duration that is long enough to permit the first mobile station to determine whether it must cease transmissions on the first access channel prior to initiation of a next time slot.

48. The method of claim 29, wherein each power control bit in the power control information packet is transmitted in step (A) using a modulation that permits each of the power control bits to assume one of said first, second and third states.

49. The method of claim 48, wherein said modulation corresponds to BPSK modulation.

50. The method of claim 29, wherein each power control bit in the power control information packet is transmitted in step (A) using a modulation that permits each of the power control bits to assume one of four different states.

51. The method of claim 50, wherein the four different states include a fourth state that conveys to the first mobile station that the first mobile station is transmitting at a target power level.

52. The method of claim 51, wherein said modulation corresponds to QPSK modulation.

53. A method for controlling the transmission of signals from one or more of a plurality of mobile stations to a base station on a plurality of M multiple access channels, comprising the steps of:
(A) transmitting a power control information packet formed from a plurality of power control bits from the base station to said one or more mobile stations, wherein each of the power control bits in the power control information packet has a position that is mapped to a selected access channel and to a time offset within the selected access channel;
(B) determining at the base station whether a mobile station accessed a first access channel during a time interval corresponding to a first time offset;
(C) if a mobile station accessed the first access channel during the time interval corresponding to the first time offset, then mapping a first power control bit having a first position within the power control information packet to the first access channel and the first time offset; and
(D) if a mobile station failed to access the first access channel during the time interval corresponding to the first time offset, then mapping the first power control bit having the first position within the power control information packet to the first access channel and a second time offset associated with the first access channel.

54. In a mobile radio telephone system having a plurality of cells, each of the cells having at least one base station transmitter associated therewith, a method of performing an access channel handoff for a mobile radio unit as the mobile radio unit moves from a first of said cells to a second of said cells, comprising the steps of:
(A) transmitting a first power control information packet including at least one power control bit from a first base station associated with the first cell to the mobile radio unit, wherein the at least one power control bit from the first base station is transmitted at a first time interval that corresponds to a first access channel;
(B) transmitting a second power control information packet including at least one power control bit from a second base station associated with the second cell to the mobile radio unit, wherein the at least one power control bit from the second base station is associated with the first access channel and with the second base station, wherein each of the power control bits in the first and second power control information packets have a position that is mapped to a selected access channel and to a base station associated with the selected access channel;
(C) receiving at the mobile radio unit the first and second power control information packets, determining a state of the at least one power control bit from the first base station and a state of the at least one power control bit from the second base station, and determining an output power adjustment level in response to the state of the at least one power control bit from the first base station and the state of the at least one power control bit from the second base station;
(D) transmitting a message from the mobile radio unit to the first base station and the second base station on the first access channel during the handoff, wherein said message is transmitted from the mobile radio unit in accordance with the output power adjustment level determined in step (C).

55. The method of claim 54, wherein the first access channel corresponds to a reverse access channel (R-ACH) in a CDMA radio telephone system.

56. An apparatus for controlling the transmission of signals from one or more of a plurality of mobile stations to a base station on a plurality of M multiple access channels, comprising:
- (A) a base station transmitter that transmits a power control information packet formed from a plurality of power control bits from the base station to said one or more mobile stations, wherein each of the power control bits in the power control information packet has a position that is mapped to a selected access channel and to a time offset within the selected access channel;
- (B) a receiver at a first mobile station that receives the power control information packet;
- (C) a transmitter at the first mobile station, wherein the transmitter at the first mobile station transmits a message from the first mobile station to the base station on a first access channel and at a first time offset associated with the first access channel, wherein said message is transmitted from the first mobile station at a power level; and
- (D) a controller at the first mobile station that determines said power level in response to a first power control bit in the power control information packet, the first power control bit being located in a first position in the power control information packet, and the first position being mapped to the first access channel and the first time offset.

57. An apparatus for controlling the transmission of signals from two or more of a plurality of mobile stations to a base station on a plurality of M multiple access channels, comprising:
- (A) a base station transmitter that transmits a power control information packet formed from a plurality of power control bits from the base station to said one or more mobile stations, wherein each of the power control bits in the power control information packet has a position that is mapped to a selected access channel;
- (B) a receiver at a first mobile station that receives the power control information packet;
- (C) a receiver at a second mobile station that receives the power control information packet; and
- (D) first and second transmitters at the first and second mobile stations, the first and second transmitters simultaneously transmitting messages from the first mobile station and the second mobile station to the base station on a first access channel, wherein the messages from the first and second mobile stations are transmitted on the first access channel at power levels that are determined in response to only a first power control bit in the power control information packet, wherein the first power control bit is located in a first position in the power control information packet, and the first position is mapped to the first access channel.

58. An apparatus for controlling the transmission of signals from one or more of a plurality of mobile stations to a base station on one or more of a plurality of multiple access channels, comprising:
- (A) a base station transmitter that transmits a power control information packet formed from a plurality of power control bits from the base station to said one or more mobile stations, wherein the power control bits in the power control information packet are transmitted by the base station transmitter using a modulation that permits each of the power control bits to assume one of first, second and third different states;
- (B) a receiver at the first mobile station that receives the power control information packet;
- (C) a controller at the first mobile station that identifies a state of a first power control bit associated with a first access channel;
- (D) a transmitter at the first mobile station, coupled to the controller, the transmitter at the first mobile station performing one of first, second or third operations if said state of said first power control bit corresponds to said first state;
  wherein said first operation corresponds to initiating the transmission of message information from the first mobile station to the base station on the first access channel, the second operation corresponds to inhibiting the initiation of transmission of message information from the first mobile station to the base station on the first access channel; and the third operation corresponds to ceasing the transmission of message information from the first mobile station to the base station on the first access channel;
- (E) said controller increasing an output power level of the first mobile station on the first access channel if the state of the first power control bit corresponds to said second state; and
- (F) said controller decreasing the output power level of the first mobile station on the first access channel if the state of the first power control bit corresponds to said third state.

59. An apparatus for controlling the transmission of signals from one or more of a plurality of mobile stations to a base station on a plurality of M multiple access channels, comprising:
- (A) a base station transmitter that transmits a power control information packet formed from a plurality of power control bits from the base station to said one or more mobile stations, wherein each of the power control bits in the power control information packet has a position that is mapped to a selected access channel and to a time offset within the selected access channel;
- (B) a controller at the base station that determines whether a mobile station accessed a first access channel during a time interval corresponding to a first time offset;
- (C) said controller mapping a first power control bit having a first position within the power control information packet to the first access channel and the first time offset if a mobile station accessed the first access channel during the time interval corresponding to the first time offset; and
- (D) said controller mapping the first power control bit having the first position within the power control information packet to the first access channel and a second time offset associated with the first access channel if a mobile station failed to access the first access channel during the time interval corresponding to the first time offset.

60. In a mobile radio telephone system having a plurality of cells, each of the cells having at least one base station transmitter associated therewith, an apparatus for performing an access channel handoff for a mobile radio unit as the mobile radio unit moves from a first of said cells to a second of said cells, comprising:
- (A) a first base station transmitter that transmits a first power control information packet including at least one power control bit from a first base station associated with the first cell to the mobile radio unit, wherein the at least one power control bit from the first base station is transmitted at a first time interval that corresponds to a first access channel;

(B) a second base station transmitter that transmits a second power control information packet including at least one power control bit from a second base station associated with the second cell to the mobile radio unit, wherein the at least one power control bit from the second base station is associated with the first access channel and with the second base station, wherein each of the power control bits in the first and second power control information packets have a position that is mapped to a selected access channel and to a base station associated with the selected access channel;

(C) a receiver at the mobile radio unit that receives the first and second power control information packets;

(D) a controller at the mobile radio unit that determines a state of the at least one power control bit from the first base station, a state of the at least one power control bit from the second base station, the controller also determining an output power adjustment level in response to the state of the at least one power control bit from the first base station and the state of the at least one power control bit from the second base station; and (E) a transmitter in the mobile radio unit that transmits a message from the mobile radio unit to the first base station and the second base station on the first access channel during the handoff, wherein said message is transmitted from the mobile radio unit in accordance with the output power adjustment level determined by the controller.

61. An apparatus for controlling the transmission of signals from one or more of a plurality of mobile stations to a base station on a plurality of M multiple access channels, comprising:

(A) means for transmitting a power control information packet formed from a plurality of power control bits from the base station to said one or more mobile stations, wherein each of the power control bits in the power control information packet has a position that is mapped to a selected access channel and to a time offset within the selected access channel;

(B) means for receiving the power control information packet at a first mobile station; and (C) means for transmitting a message from the first mobile station to the base station on a first access channel and at a first time offset associated with the first access channel, wherein said message is transmitted from the first mobile station at a power level determined in response to a first power control bit in the power control information packet, the first power control bit is located in a first position in the power control information packet, and the first position is mapped to the first access channel and the first time offset.

62. An apparatus for controlling the transmission of signals from two or more of a plurality of mobile stations to a base station on a plurality of M multiple access channels, comprising:

(A) means for transmitting a power control information packet formed from a plurality of power control bits from the base station to said one or more mobile stations, wherein each of the power control bits in the power control information packet has a position that is mapped to a selected access channel;

(B) means for receiving the power control information packet at a first mobile station and a second mobile station; and (C) means for simultaneously transmitting messages from the first mobile station and the second mobile station to the base station on a first access channel, wherein the messages from the first and second mobile stations are transmitted on the first access channel at power levels that are determined in response to only a first power control bit in the power control information packet, wherein the first power control bit is located in a first position in the power control information packet, and the first position is mapped to the first access channel.

63. An apparatus for controlling the transmission of signals from one or more of a plurality of mobile stations to a base station on one or more of a plurality of multiple access channels, comprising:

(A) means for transmitting a power control information packet formed from a plurality of power control bits from the base station to said one or more mobile stations, wherein the power control bits in the power control information packet are transmitted using a modulation that permits each of the power control bits to assume one of first, second and third different states;

(B) means for receiving the power control information packet at a first mobile station;

(C) means for identifying, at the first mobile station, a state of a first power control bit associated with a first access channel;

(D) means for performing one of first, second or third operations with said first mobile station if said state of said first power control bit corresponds to said first state;
wherein said first operation corresponds to initiating the transmission of message information from the first mobile station to the base station on the first access channel, the second operation corresponds to inhibiting the initiation of transmission of message information from the first mobile station to the base station on the first access channel; and the third operation corresponds to ceasing the transmission of message information from the first mobile station to the base station on the first access channel;

(E) means for increasing an output power level of the first mobile station on the first access channel if the state of the first power control bit corresponds to said second state; and (F) means for decreasing the output power level of the first mobile station on the first access channel if the state of the first power control bit corresponds to said third state.

64. An apparatus for controlling the transmission of signals from one or more of a plurality of mobile stations to a base station on a plurality of M multiple access channels, comprising:

(A) means for transmitting a power control information packet formed from a plurality of power control bits from the base station to said one or more mobile stations, wherein each of the power control bits in the power control information packet has a position that is mapped to a selected access channel and to a time offset within the selected access channel;

(B) means for determining at the base station whether a mobile station accessed a first access channel during a time interval corresponding to a first time offset;

(C) means for mapping a first power control bit having a first position within the power control information packet to the first access channel and the first time offset if a mobile station accessed the first access channel during the time interval corresponding to the first time offset; and (D) means for mapping the first power control bit having the first position within the power control information packet to the first access channel and a second time offset associated with the first access channel if a mobile station failed to access the first access channel during the time interval corresponding to the first time offset.

65. In a mobile radio telephone system having a plurality of cells, each of the cells having at least one base station transmitter associated therewith, an apparatus for performing an access channel handoff for a mobile radio unit as the mobile radio unit moves from a first of said cells to a second of said cells, comprising:

(A) means for transmitting a first power control information packet including at least one power control bit from a first base station associated with the first cell to the mobile radio unit, wherein the at least one power control bit from the first base station is transmitted at a first time interval that corresponds to a first access channel;

(B) means for transmitting a second power control information packet including at least one power control bit from a second base station associated with the second cell to the mobile radio unit, wherein the at least one power control bit from the second base station is associated with the first access channel and with the second base station, wherein each of the power control bits in the first and second power control information packets have a position that is mapped to a selected access channel and to a base station associated with the selected access channel;

(C) means for receiving at the mobile radio unit the first and second power control information packets, determining a state of the at least one power control bit from the first base station and a state of the at least one power control bit from the second base station, and determining an output power adjustment level in response to the state of the at least one power control bit from the first base station and the state of the at least one power control bit from the second base station;

(D) means for transmitting a message from the mobile radio unit to the first base station and the second base station on the first access channel during the handoff, wherein said message is transmitted from the mobile radio unit in accordance with the output power adjustment level.

* * * * *